United States Patent
Zeng

(10) Patent No.: US 7,715,489 B2
(45) Date of Patent: May 11, 2010

(54) SPACE TIME TRANSMIT DIVERSITY (STTD) DECODER WITHIN A HSDPA RAKE RECEIVER

(75) Inventor: Huaiyu (Hanks) Zeng, Red Bank, NJ (US)

(73) Assignee: Broadcom Corporation, Irvine, CA (US)

( * ) Notice: Subject to any disclaimer, the term of this patent is extended or adjusted under 35 U.S.C. 154(b) by 673 days.

(21) Appl. No.: 11/654,956

(22) Filed: Jan. 18, 2007

(65) Prior Publication Data

US 2007/0189410 A1 Aug. 16, 2007

Related U.S. Application Data

(60) Provisional application No. 60/772,427, filed on Feb. 10, 2006.

(51) Int. Cl.
*H04B 7/02* (2006.01)

(52) U.S. Cl. .................................................. 375/267

(58) Field of Classification Search ................. 375/267, 375/299, 316, 347, 349; 700/53; 455/101, 455/132–141

See application file for complete search history.

(56) References Cited

U.S. PATENT DOCUMENTS

| | | | | |
|---|---|---|---|---|
| 6,804,307 B1 * | 10/2004 | Popovic | ..................... | 375/299 |
| 6,862,275 B1 * | 3/2005 | Dabak | ........................ | 370/342 |
| 7,218,692 B2 * | 5/2007 | Dabak et al. | ................ | 375/346 |
| 7,397,842 B2 * | 7/2008 | Bottomley et al. | .......... | 375/148 |

* cited by examiner

*Primary Examiner*—Sam K Ahn
(74) *Attorney, Agent, or Firm*—Garlick Harrison & Markison; Bruce E. Garlick

(57) ABSTRACT

A Space Time Transmit Diversity (STTD) Decoder includes a physical channel despreader, a delay buffer, an upper processing branch, a lower processing branch and a combiner. The upper processing branch is operable to apply a conjugate of a first channel estimate to the delay buffer symbol output and produce non STTD encoded symbols. The lower processing branch is operable to read delayed delay buffer symbol outputs and apply a conjugate of a second channel estimate when active in the STTD mode. The lower processing branch then may apply an STTD decoder scheme to the delay buffer symbol output to produce non STTD encoded symbols. The combiner then combines the non STTD encoded symbols of the upper processing branch and non STTD encoded symbols of the lower processing branch to produce a single set of non STTD encoded symbols.

21 Claims, 19 Drawing Sheets

SPACE TIME TRANSMIT DIVERSITY (STTD) DECODER WITHIN A HSDPA RAKE RECEIVER

RELATED APPLICATIONS

This application claims priority to and incorporates by reference in its entirety for all purposes U.S. Provisional Application No. 60/772,427 filed on 10 Feb. 2006 entitled "SPACE TIME TRANSMIT DIVERSITY (STTD) DECODER WITHIN A HSDPA RAKE RECEIVER" to Hanks Zeng.

BACKGROUND

1. Technical Field

The present invention relates generally to wireless communication systems; and more particularly to the despreading of spread data communications received by a wireless terminal in such a wireless communication system.

2. Related Art

Cellular wireless communication systems support wireless communication services in many populated areas of the world. Cellular wireless communication systems include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its serviced cell/ sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced, and torn down. Popular currently employed cellular standards include the Global System for Mobile telecommunications (GSM) standards, the North American Code Division Multiple Access (CDMA) standards, and the North American Time Division Multiple Access (TDMA) standards, among others. These operating standards support both voice communications and data communications. More recently introduced operating standards include the Universal Mobile Telecommunications Services (UMTS)/Wideband CDMA (WCDMA) standards. The UMTS/WCDMA standards employ CDMA principles and support high throughput, both voice and data. As contrasted to the North American CDMA standards, transmissions within a UMTS/WCDMA system are not aligned to a timing reference, i.e., GPS timing reference. Thus, synchronization to a base station by a wireless terminal is more complicated in a WCDMA system than in a North American CDMA system. Despreading of received spread communications consumes significant processing resources. Such continuous operations can overload a baseband processor causing degradation of performance and decrease battery life.

BRIEF SUMMARY OF THE INVENTION

The present invention is directed to apparatus and methods of operation that are further described in the following Brief Description of the Drawings, the Detailed Description of the Drawings, and the Claims. Other features and advantages of the present invention will become apparent from the following detailed description of the invention made with reference to the accompanying drawings.

DETAILED DESCRIPTION OF THE DRAWINGS

Figure 1:
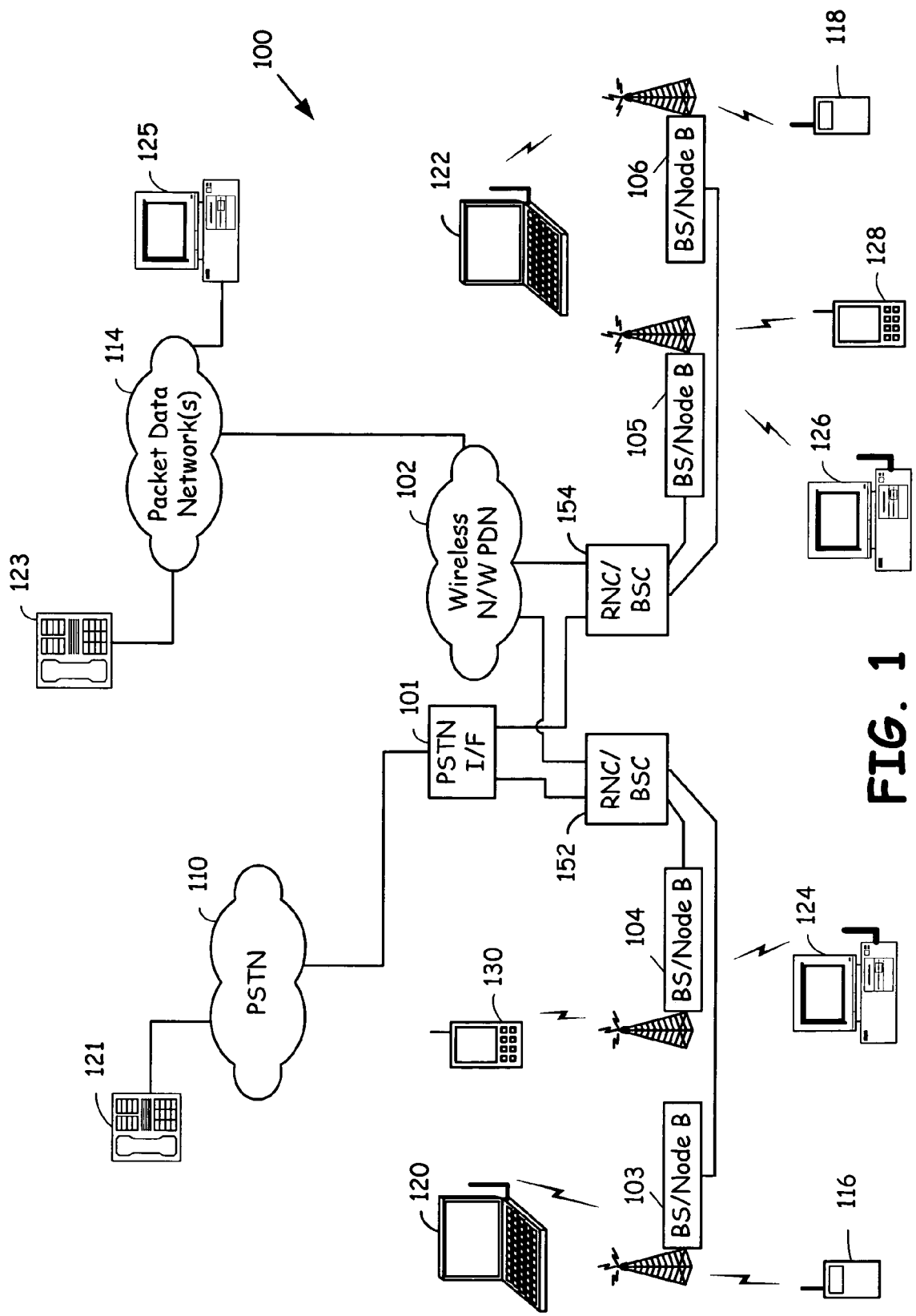
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data network(s) 114, e.g., the Internet, WANs, LANs, etc. A conventional voice terminal 121 couples to the PSTN 110. A Voice over Internet Protocol (VoIP) terminal 123 and a personal computer 125 couple to the packet data network(s) 114. The PSTN Interface 101 couples to the PSTN 110. Of course, this particular structure may vary from system to system.

Each of the base stations/node Bs 103-106 services a cell/set of sectors within which it supports wireless communications. Wireless links that include both forward link components and reverse link components support wireless communications between the base stations/node Bs 103-106 and their serviced wireless terminals 116-130. These wireless links support digital data communications, VoIP communications, and other digital multimedia communications. The cellular wireless communication system 100 may also be backward compatible in supporting analog operations as well. The cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc.

Wireless terminals 116, 118, 120, 122, 124, 126, 128, and 130 couple to the cellular wireless communication system 100 via wireless links with the base stations/node Bs 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standards, and/or the GSM standards.

Figure 2:
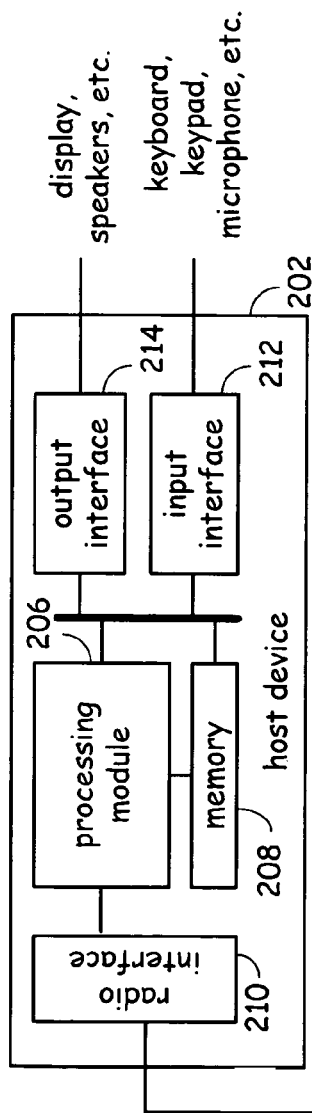
FIG. 2 is a block diagram functionally illustrating a wireless terminal constructed according to the present invention.
Figure 2:
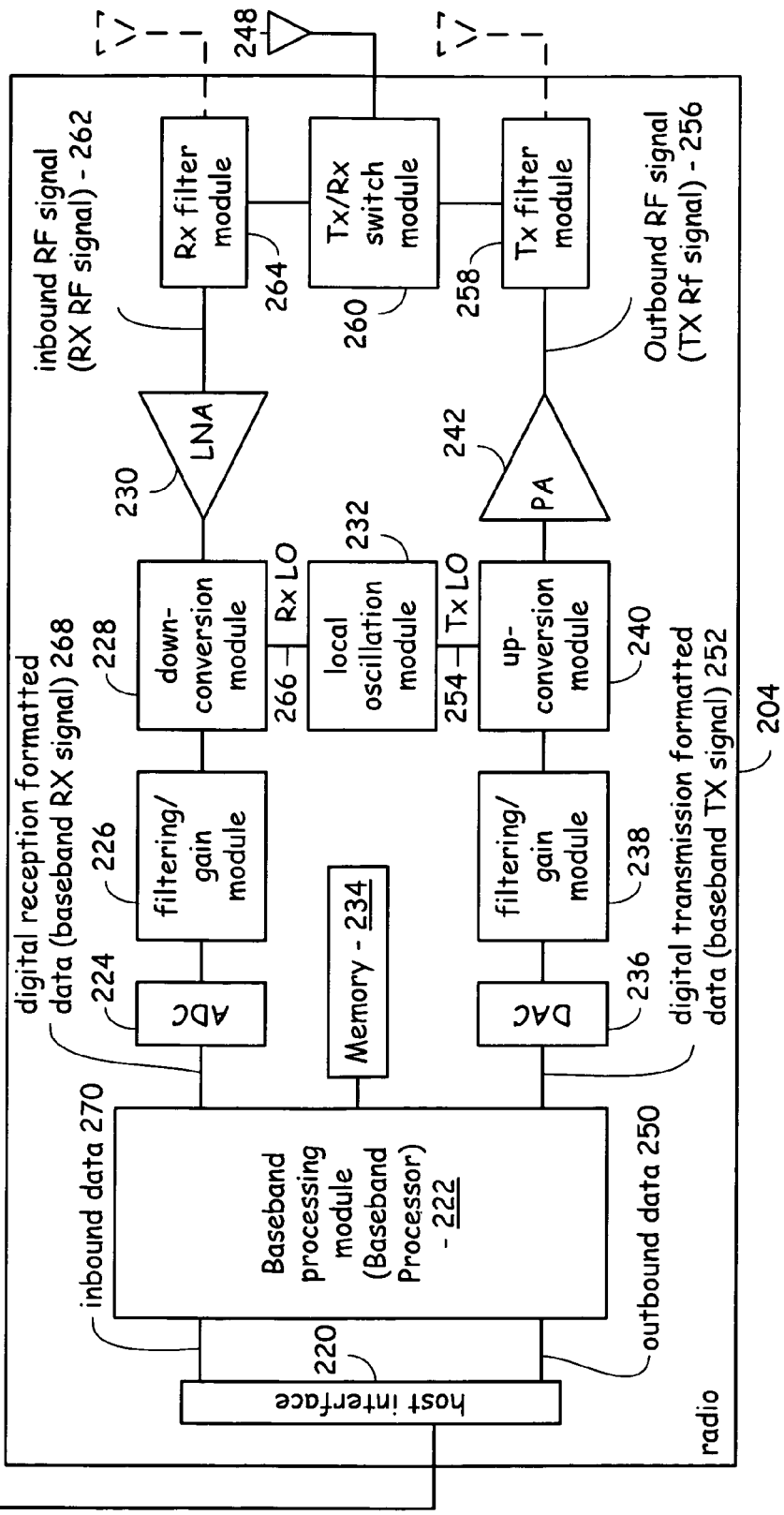

FIG. 2 is a schematic block diagram illustrating a wireless terminal that includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card and, therefore, be housed separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to output display device(s) such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard with which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station and received via the antenna 248, the TX/RX switch module 260, and the RX filter module 264. The low noise amplifier 230 receives the inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204.

The host interface 220 provides the recaptured inbound data 270 to the host processing components 202 via the radio interface 210.

Figure 3:
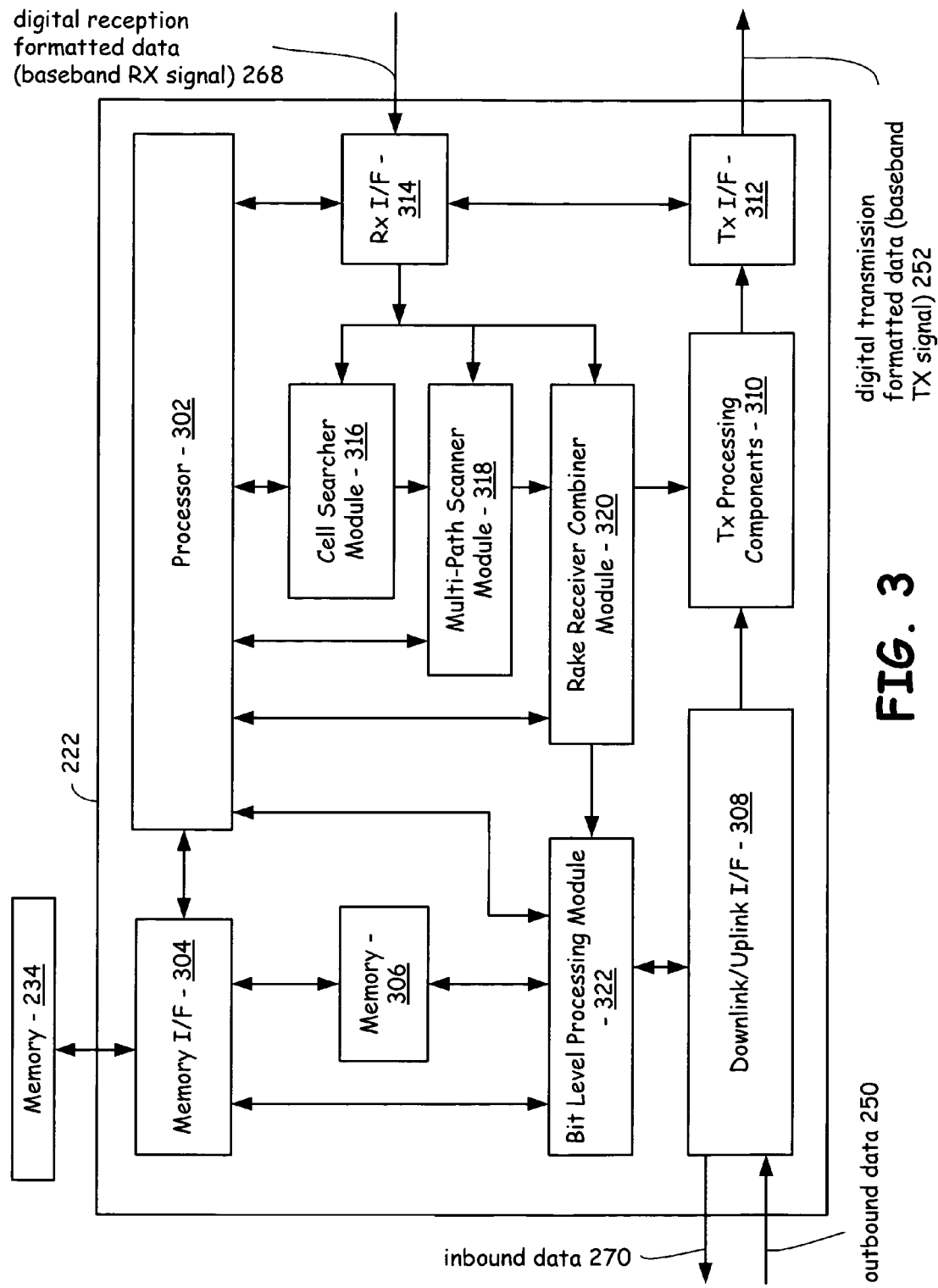
FIG. 3 is a block diagram illustrating components of a baseband processing module according to an embodiment of the present invention.

FIG. 3 is a block diagram illustrating components of a baseband processing module 222 according to an embodiment of the present invention. Components of the baseband processing module (baseband processor) 222 include a processor 302, a memory interface 304, onboard memory 306, a downlink/uplink interface 308, TX processing components 310, and a TX interface 312. The baseband processing module 222 further includes an RX interface 314, a cell searcher module 316, a multi-path scanner module 318, a rake receiver combiner module 320, and a bit level processing module 322 that performs deinterleaving operations, rate matching operations, DTX processing operations, convolution/Turbo encoding/decoding operations, CRC operations, etc. The baseband processing module 222 couples in some embodiments to external memory 234. However, in other embodiments, memory 306 services the memory requirements if the baseband processing module 222 302.

As was previously described with reference to FIG. 2, the baseband processing module 222 receives outbound data 250 from coupled host processing components 202 and provides inbound data 270 to the coupled host processing components 202. The baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222.

The downlink/uplink interface 308 is operable to receive the outbound data 250 from coupled host processing components, e.g., the host processing component 202 via host interface 220. The downlink/uplink interface 308 is operable to provide inbound data 270 to the coupled host processing components 202 via the host interface 220. As the reader will appreciate, the baseband processing module 222 may be formed on a single integrated circuit with the other components of radio 204. Alternately, the radio 204 (including the baseband processing module 222) may be formed on a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, the baseband processing module 222 and the host processing components 202 may be formed on one or more separate integrated circuit(s). Many differing integrated circuit constructs are possible without departing from the teachings of the present invention. TX processing components 310 and TX interface 312 communicatively couple to the RF front end as illustrated in FIG. 2 and to the downlink/uplink interface 308. The TX processing components 310 and TX interface 312 are operable to receive the outbound data from the downlink/uplink interface 304, to process the outbound data to produce the baseband TX signal 252 and to output the baseband TX signal 252 to the RF front end as was described with reference to FIG. 2. Each of the components of FIG. 3 may be implemented as hardware, software, or a combination of hardware and software. Based upon the particular functions performed by the components of FIG. 3, some of the components are most efficiently implemented in hardware, some most efficiently implemented in software, and some most efficiently implemented as a combination of hardware and software.

Figure 4A:
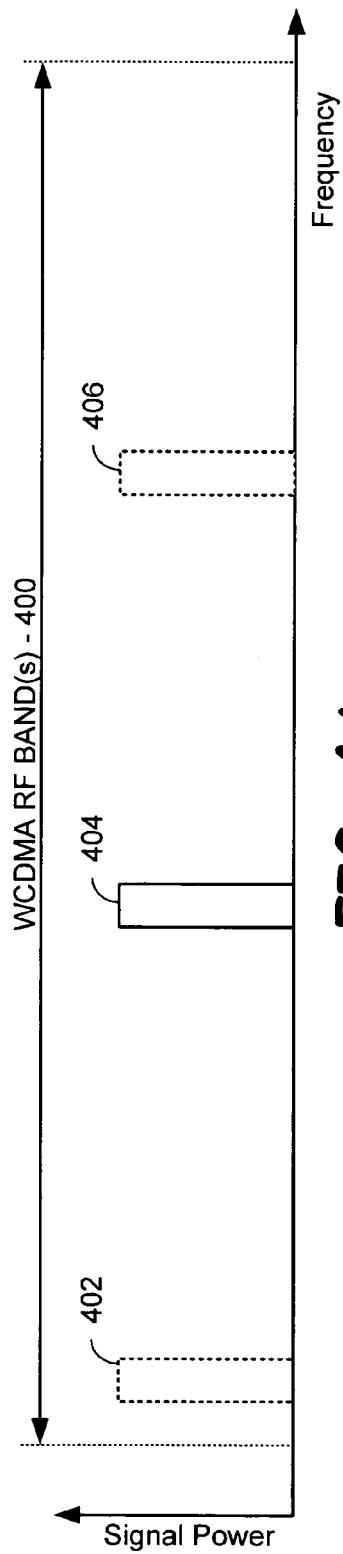
FIG. 4A is a graph illustrating diagrammatically the power spectral density of WCDMA RF band(s) supporting multiple RF carriers.

FIG. 4A is a graph illustrating diagrammatically the power spectral density of WCDMA RF band(s) 400 supporting multiple RF carriers 402, 404, and 406. The WCDMA RF band(s) 400 extend across a frequency spectrum and include WCDMA RF carriers 402, 404, and 406. According to one aspect of the present invention, the cell searcher module 316 of the baseband processing module 222 of an RF transceiver that supports WCDMA operations according to the present invention is operable to scan the WCDMA RF band(s) 400 to identify WCDMA RF energy of at least one WCDMA carrier 402, 404, or 406. During initial cell search operations, the cell searcher module 316 will, in combination with other components of the baseband processing module 222, identify a strongest WCDMA carrier, e.g., 404. Then, the cell searcher module 316 synchronizes to WCDMA signals within the WCDMA carrier 404. These WCDMA signals correspond to a particular base station cell or sector. In these initial cell search synchronization operations, the cell searcher module 316 preferably synchronizes to a strongest cell/sector.

WCDMA signals transmitted from multiple base stations/sectors may use a common WCDMA RF carrier 404. Alternately, the WCDMA signals from differing base stations/sectors may use differing WCDMA carriers, e.g., 402 or 406. According to the present invention, the cell searcher module 316 and the baseband processing module 222 are operable to synchronize to WCDMA signals from differing cells/sectors operating in one or more of the WCDMA RF bands 402, 404, or 406. Such synchronization operations occur not only for initial cell search but for neighbor cell search or detected cell search operations.

Figure 4B:
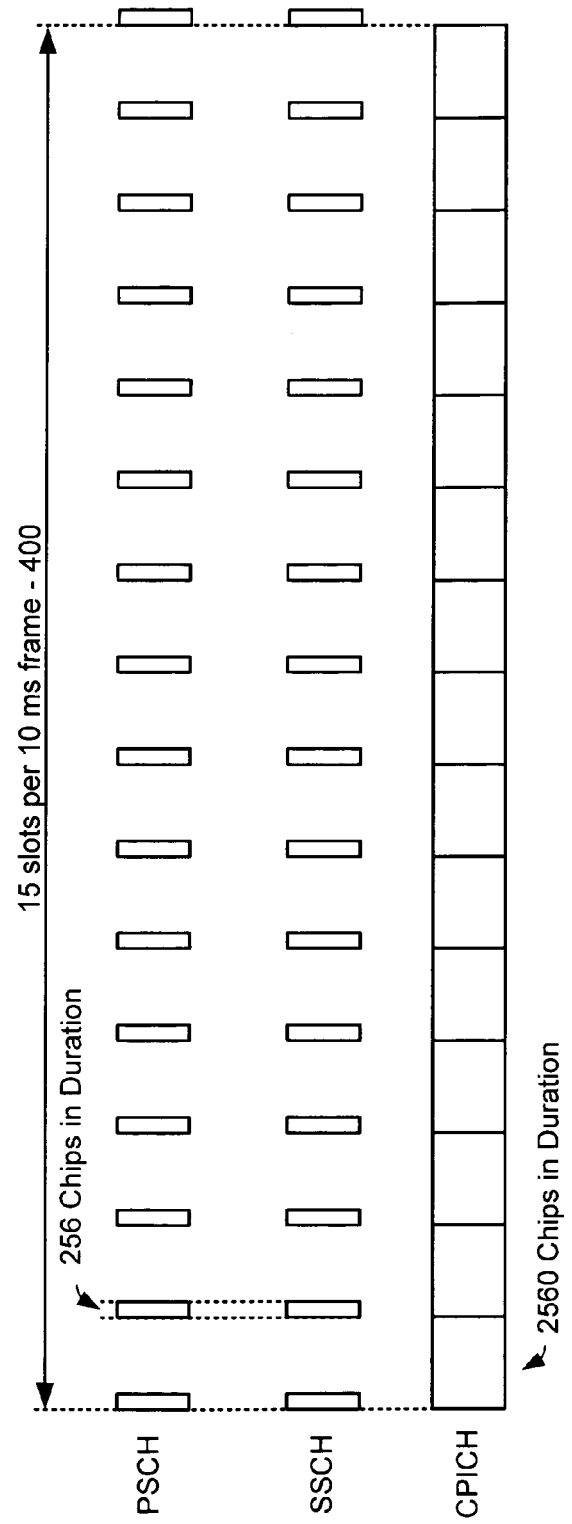
FIG. 4B is a block diagram diagrammatically illustrating the timing of various channels of a WCDMA system employed for cell searching and base station synchronization according to the present invention.

FIG. 4B is a block diagram diagrammatically illustrating the timing of various channels of a WCDMA system employed for cell searching and base station synchronization according to the present invention. The WCDMA signal illustrated has a 15 slot frame structure that extends across 10 ms in time. The WCDMA signal includes a Synchronization Channel (SCH) and a Common Pilot Channel (CPICH), which are introduced in the downlink to assist wireless transceivers in performing cell search operations. The SCH is further split into a primary SCH (PSCH) and a secondary SCH (SSCH). The PSCH carries a primary synchronization code (PSC) which is chosen to have good periodic auto correlation properties and the secondary SCH (SSCH) carries a secondary synchronization code (SSC). The PSCH and the SSCH are constructed such that their cyclic-shifts are unique so that reliable slot and frame synchronization can be achieved. The PSCH and the SSCH are 256-chips long with special formats and appear ⅒ of each time slot. The rest of time slot is Common Control Physical Channel (CCPCH). As shown in FIG. 4A, the PSCH and the SSCH are transmitted once in the same position in every slot. The PSCH code is the same for all time slots, and therefore is used to detect slot boundary. The SSCH is used to identify scrambling code group and frame boundary. Thus, the SSCH sequences vary from slot to slot and are coded by a code-book with 64 code-words (each representing a code-group). The CPICH carries pre-defined symbols with a fixed rate (30 kbps, hence 10 symbols per time slot) and spreading factor of 256. The channelization code for CPICH is fixed to the $0^{th}$ code.

The cell searcher module 316 of the baseband processing module 222 of a WCDMA RF transceiver is operable to: (1) scan for WCDMA energy within a baseband RX signal received at the RX interface corresponding to the WCDMA signal; (2) acquire a slot synchronization to the WCDMA signal based upon correlation with the PSCH of the WCDMA signal; (3) acquire frame synchronization to, and identify a code group of, the received WCDMA signal based upon correlation with the SSCH of the WCDMA signal; and (4) identify the scrambling code of the WCDMA signal based upon correlation with the CPICH of the WCDMA signal.

Figure 5A:
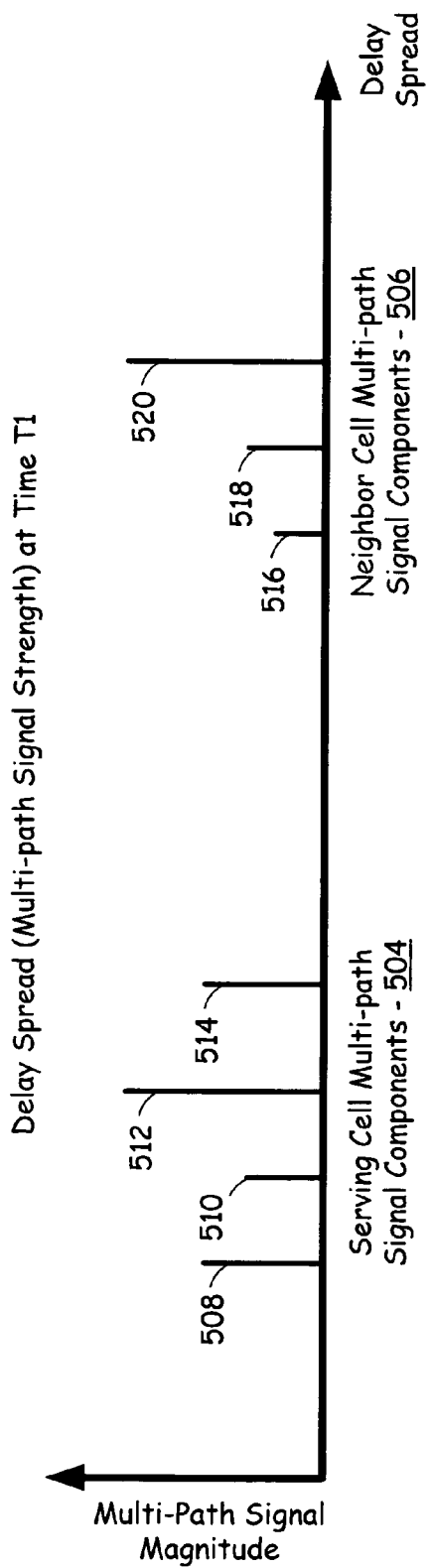
FIG. 5A is a graph illustrating an example of a multi-path delay spread at a first time.

FIG. 5A is a graph illustrating an example of a multi-path delay spread at a first time, T1. As is known, in wireless communication systems, a transmitted signal may take various routes in propagating from an RF transmitter to an RF receiver. Referring briefly again to FIG. 1, transmissions from base station 103 to wireless terminal 116 may take multiple paths with each of these multiple paths arriving in a corresponding time frame. These multiple received copies of the transmitted signal are typically referred to as "multi-path" signal components. Referring again to FIG. 5A, an example of a delay spread that includes multi-path components and their corresponding signal strength for time T1 is shown.

Serving cell signal components 504 include multi-path components 508, 510, 512, and 514 that are received at respective times with respect to a periodic reference time. Neighbor cell signal components 506 include multi-path signal components 516, 518, and 520. Note that the serving cell signal components 504 and neighbor cell signal components arrive at differing times with respect to the periodic reference time since they are not time aligned. As is known, multi-path components of a transmitted RF signal arrive in a time skewed manner at the RF receiver. As is also known, the number of received multi-path components and the signal strength and signal to interference ratio of each multi-path component varies over time.

Figure 5B:
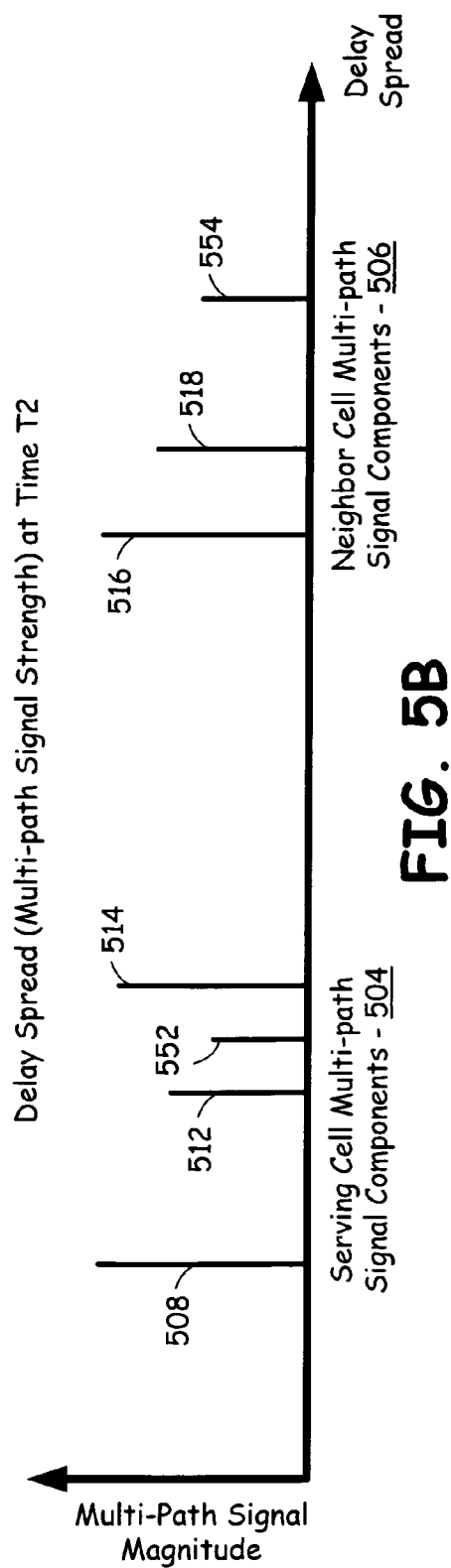
FIG. 5B is a graph illustrating the example of the multi-path delay spread of FIG. 5B at a second time.

FIG. 5B is a graph illustrating the example of the multi-path delay spread of FIG. 5A at a second time, T2. Because the characteristics of the channel from the RF transmitter to the RF receiver changes over time so does serving cell path signal components 504 and neighbor cell signal components 506. Thus, for example, the multi-path component 508 of FIG. 5B, while having the same time relationship to the periodic reference time as multi-path component 508 as shown in FIG. 5A, has a greater signal-to-interference ratio or signal-to-noise ratio than it did in FIG. 5A. Further, multi-path component 510 is missing, multi-path component 512 is smaller in magnitude, and multi-path component 514 is greater in magnitude than are their counterparts of FIG. 5B. In addition, serving cell signal components 504 include a new multi-path component 552 that is existent at time T2 but it was not existent at time T1. The process of path components existing and then ceasing to exist is often referred to as the "Birth-Death" phenomenon.

The neighbor cell multi-path signal component 506 at time T2 of FIG. 5B also differ from those at time T1 of FIG. 5A. In such case, multi-path components 516 and 518 have differing magnitudes at time T2 than they did at time T1. Further, multi-path component 520 which was strong at time T1 does not exist at time T2. Moreover, new multi-path component 554 at time T2 exists where it did not exist at time T1. The cell searcher module 316, multi-path scanner module 318, and rake receiver combiner module 320 track the existence of these multi-path components, synchronize to some of these multi-path components, and receive data via at least some of these multi-path components.

Figure 6:
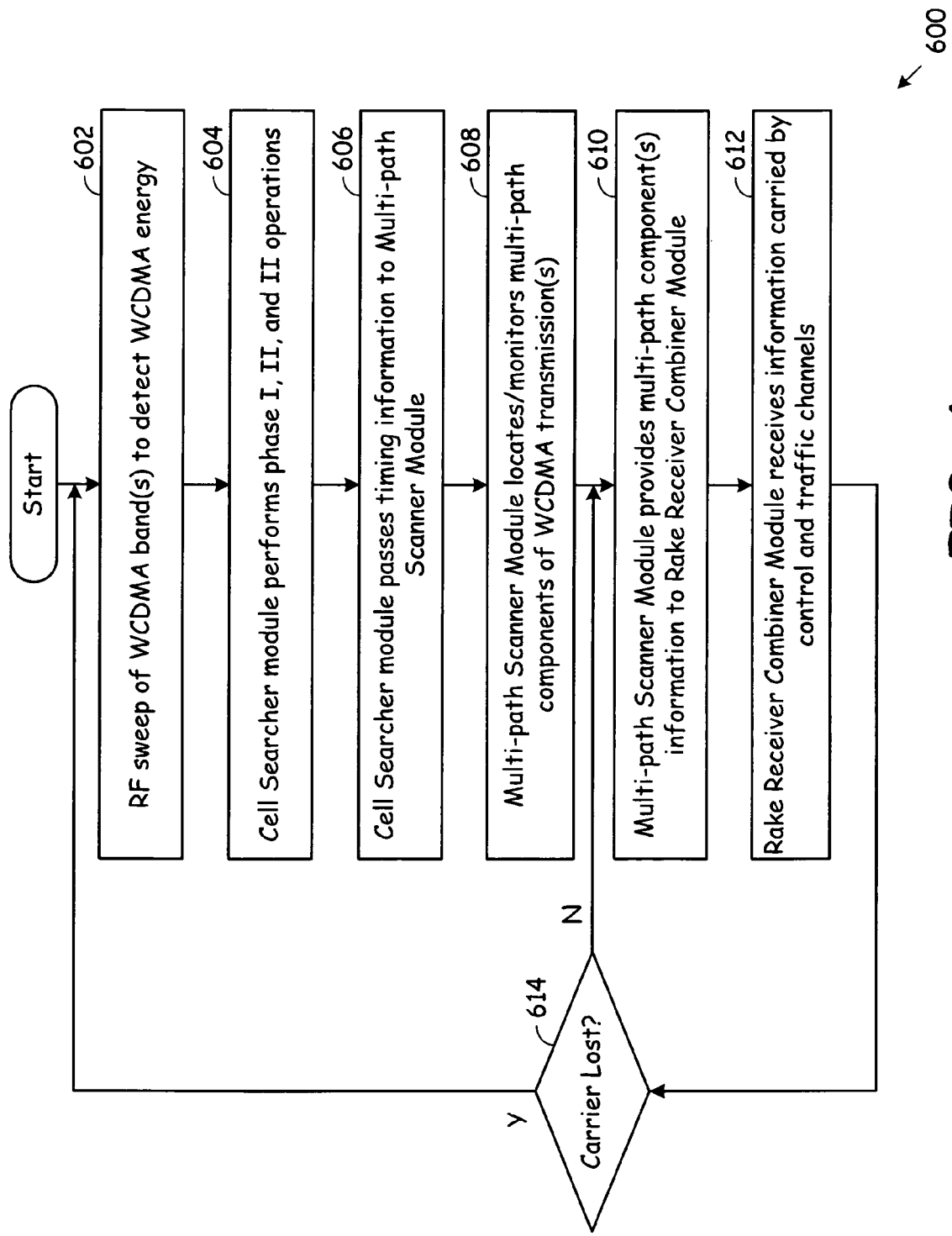
FIG. 6 is a flow chart illustrating operations of a wireless terminal in searching for, finding, synchronizing to, and receiving data from a base station according to an embodiment of the present invention.

FIG. 6 is a flow chart illustrating operations of a wireless terminal in searching for, finding, synchronizing to, and receiving data from a base station according to an embodiment of the present invention. The operations 600 of FIG. 6 are performed by the cell searcher module 316, the multi-path scanner module 318, and the rake receiver combiner module 320 of the baseband processing module 222 of the radio 204 of a wireless terminal constructed according to the present invention. The operations 600 are initiated upon start-up or reset or when the RF terminal is otherwise detecting a serving cell within a WCDMA system. Operation commences with the RF transceiver performing an RF sweep of WCDMA RF bands to detect WCDMA energy (Step 602). The RF sweep of the WCDMA RF bands is a collective effort between the RF front-end components of the RF transceiver radio 204 shown in FIG. 2 as well as the baseband processing module 222 of the radio 204 of FIG. 2. Referring to FIG. 6 and FIG. 3 jointly, in making the RF sweep of the WCDMA RF bands to detect WCDMA energy, the RF front-end tunes to various RF channels within the WCDMA RF bands 400 as shown and discussed with reference to FIG. 4A. With particular references to the components of the baseband processing module 222, the cell searcher module 316 may interact with the processor 302 in order to detect WCDMA energy during the RF sweep of the WCDMA RF bands.

After this RF sweep has been completed at Step 602, the processor 302, in cooperation with the cell searcher module 316 and the RF front-end components, identifies a particular RF band, e.g., 404 of FIG. 4A, in which to detect and synchronize to a WCDMA signal. The cell searcher module 316 of the baseband processing module 222 performs Phase I, Phase II, and Phase III operations in an initial cell search operations (Step 604). In performing its initial cell search operations, the cell searcher module 316 acquires slot synchronization to the WCDMA signal based upon correlation with the PSCH of the WCDMA signal in its Phase I operations. Then, in the Phase II operation, the cell searcher module 316 acquires frame synchronization to, and identifies a code group of, the received WCDMA signal based upon coffelation with the SSCH of the WCDMA signal. Then, in its Phase III operations, the cell searcher module 316 identifies the scrambling code of the WCDMA signal based upon correlation with the CPICH of the WCDMA signal. The manner in which the Phase I, II, and III operations of the cell searcher module 316 are performed, and the structured used thereby, is described more fully in co-pending application Ser. No. 11/221,145, filed on Sep. 6, 2005, which is incorporated herein in its entirety. The results of the Phase I, II, and III operations performed by the cell searcher module 316 yield timing information regarding at least one multi-path signal component of the WCDMA signal. In one embodiment, the Phase I, II, and III operations yield timing information and the scrambling code of a strongest multipath component of a WCDMA signal of the selected WCDMA RF carrier.

Operation continues with the cell searcher module 316 passing the timing and scrambling code information to the multi-path scanner module 318 (Step 606). This information may be passed directly or via the processor 302. The multi-path scanner module 318 then locates and monitors multi-path signal components of the WCDMA transmissions (Step 608). The multi-path scanner module 318 then provides the multi-path component timing information to the rake receiver combiner module 320 (Step 610). This information may be passed directly or via the processor 302. The rake receiver combiner module 320 then receives information carried by control and traffic channels of the WCDMA signal of the serving cell/sector (Step 612). The RF transceiver continues to receive control and traffic channel information from a serving cell until it decides to either find a new serving cell via neighbor search operations, it loses the signal from the serving cell, or upon another operational determination in which it decides to either terminate receipt of the signal from the serving cell or the carrier is lost. When the signal is lost (Step 614) or in another situation which the RF transceiver decides to move to a different RF carrier, operation proceeds again to Step 602. However, if the RF transceiver determines that continued operation of the particular RF carrier and for the particular serving cell should continue, operation continues to Step 610 again.

Figure 7:
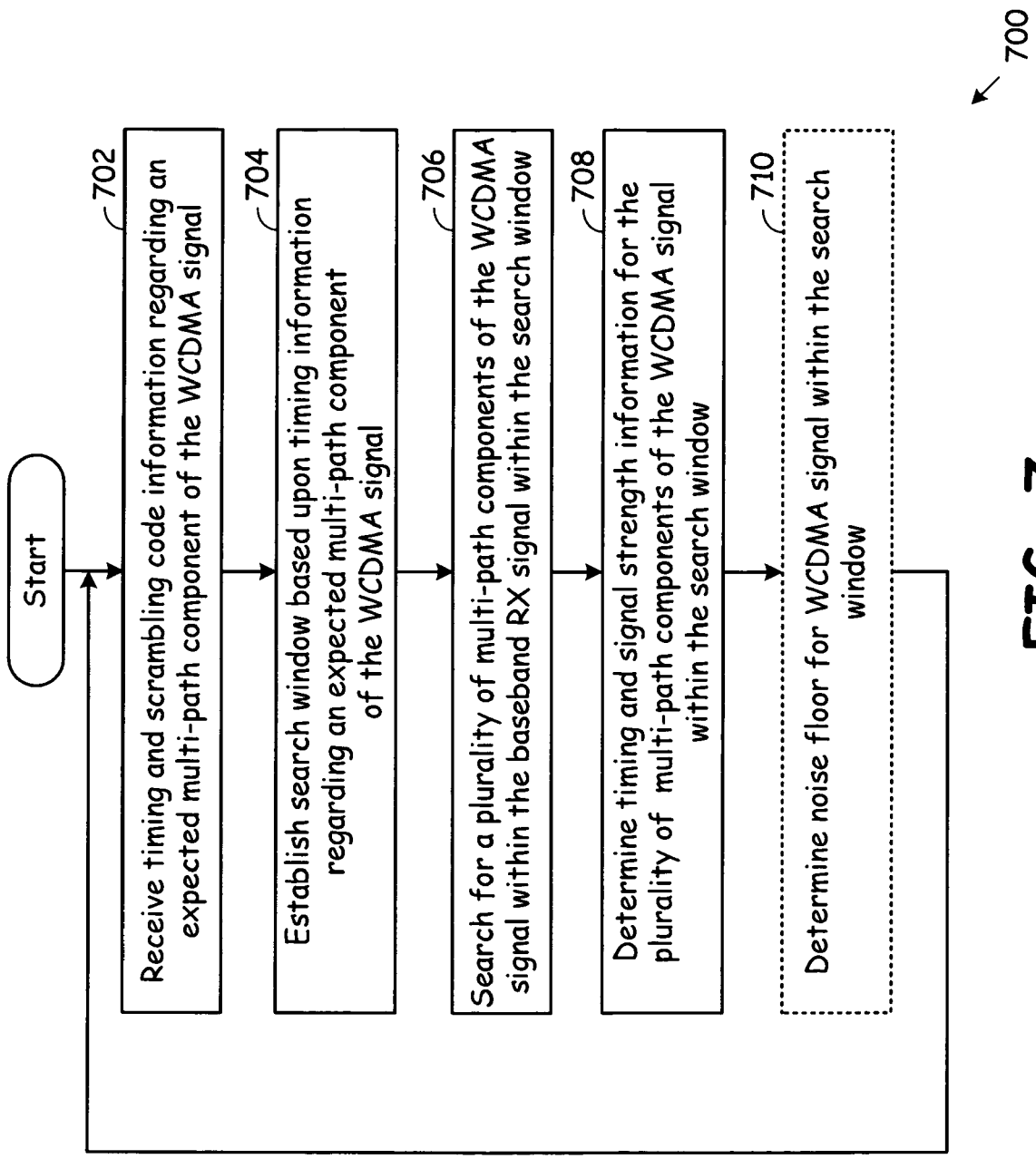
FIG. 7 is a flow chart illustrating operations of a multi-path scanner module according to an embodiment of the present invention.

FIG. 7 is a flow chart illustrating operations of a multi-path scanner module according to an embodiment of the present invention. These operations 700 commence with the multi-path scanner module receiving timing and scrambling code information regarding an expected multi-path signal component of the WCDMA signal (Step 702). This timing and scrambling code information in one operation is received from the cell searcher module 316. After the multi-path scanner module has received the timing and scrambling code information at Step 702, the multi-path scanner module establishes a search window based upon the timing information and regarding an expected multi-path signal component of the WCDMA signal (Step 704). As will be described further with reference to FIG. 8, the multi-path scanner module is interested in searching for multi-path signal components of the WCDMA signal within a search window corresponding to an expected length of the corresponding channel.

Then, the multi-path scanner module 318 searches for a plurality of multi-path signal components of the WCDMA signal within the search window (Step 706). In one particular embodiment of the present invention, the multi-path signal components of the WCDMA signals are found by correlating the WCDMA signal within the search window with the expected CPICH channel. The CPICH of the WCDMA signal has a known symbol pattern, has been spread using a known spreading sequence, and has been scrambled according to the scrambling code received at Step 702. Thus, with all of this information known, the multi-path scanner module 318 may search for the CPICH at all possible alignment positions within the search window. The alignment positions within the search window at which the CPICH is "found" represent the multi-path signal components of the WCDMA signal within the search window. The manner in which the multi-path scanner module operates, and the structured used thereby, is described more fully in co-pending application Ser. No. 11/216,449, filed on Aug. 31, 2005, which is incorporated herein in its entirety.

Then, the multi-path scanner module determines timing and signal path strength information of the plurality of multi-path signal components to the WCDMA signal within the search window (Step 708). Finally, the multi-path scanner module optionally determines the noise floor from the WCDMA signal within the search window (Step 710). Generally, at least one multi-path signal component of the WCDMA signal will appear within the search window. More typically, a plurality of multi-path signal components of the WCDMA signal will appear within the search window, each having a respective timing and signal strength associated therewith. Locations within the search window that do not have paths present represent the noise floor for the search window. Thus, at Step 710, the multi-path scanner module also is able to determine the noise floor when locating multi-path signal components within the search window. From Step 710, operation returns to Step 702. According to the present invention, the multi-path scanner module is operable to search for a WCDMA signal transmitted from one base station cell or sector within each time slot. Thus, the multi-path scanner module can search for different WCDMA signals transmitted from differing base station in adjacent slots. Further, long term timing information may be determined by the multi-path scanner module 318 searching for multi-path signal components of the WCDMA signal in multiple slots and/or slots in multiple frames.

Figure 8:
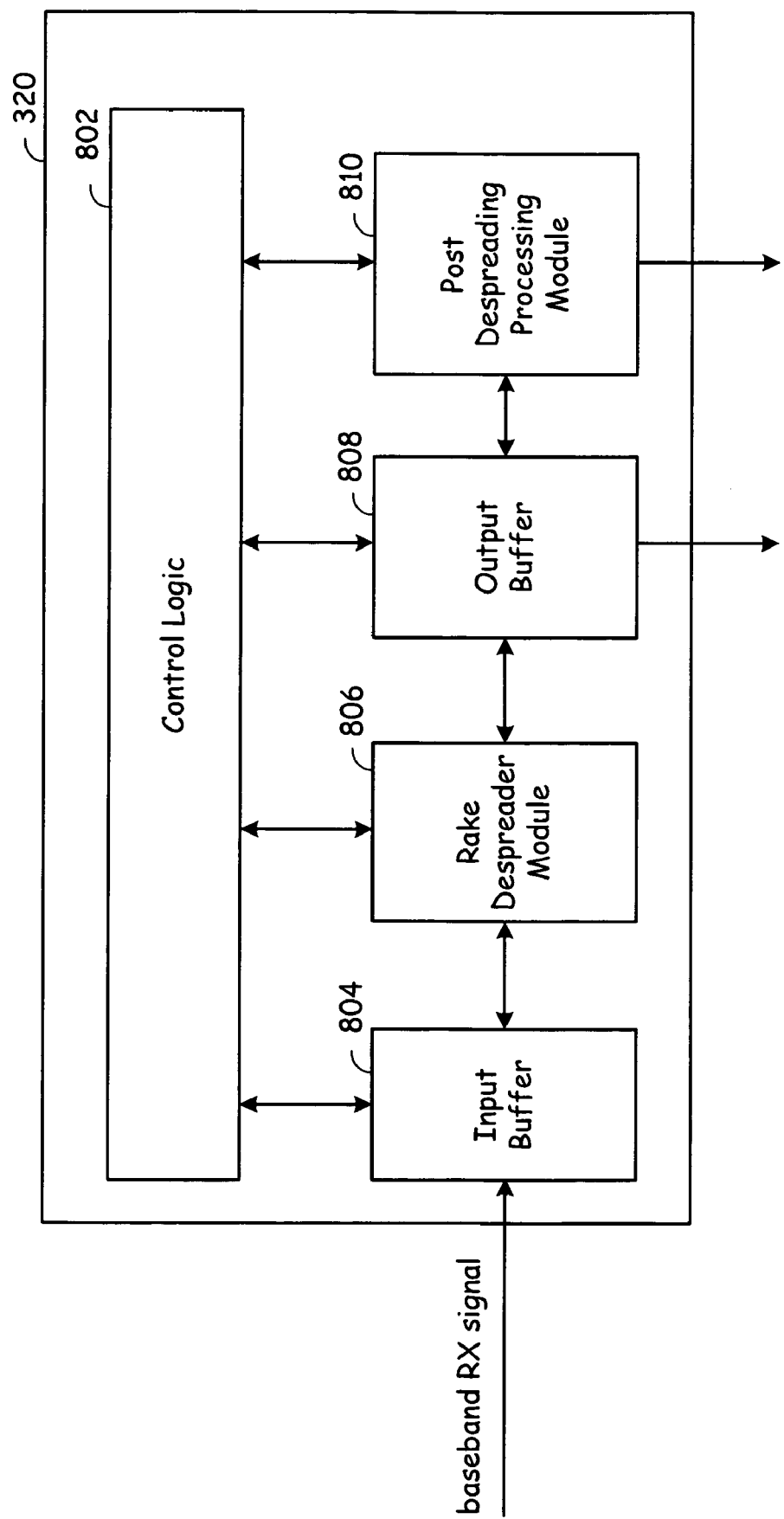
FIG. 8 is a block diagram illustrating a rake receiver combiner module according to an embodiment of the present invention.

FIG. 8 is a block diagram illustrating a rake receiver combiner module according to an embodiment of the present invention. The rake receiver combiner module 320 communicatively couples to the RX interface 314 as was shown with reference to FIG. 3. The rake receiver combiner module 320 includes control logic 802, an input buffer 804, a rake despreader module 806, an output buffer 808, and may include a post dispreading processing module 810. The input buffer 804 communicatively couples to the control logic 802 and to the RX interface 314. The input buffer 804 is operable to receive and store baseband RX signal samples. The input buffer 804 may be any type of buffer structure in which the RX signal samples are stored and which may be accessed to read and write data. In the embodiment illustrated, the input buffer 804 receives data from the RX interface 314 and produces data to the rake despreader module 806.

The rake despreader module 806 communicatively couples to the control logic 802 and to the input buffer 804. The rake despreader module 806 is operable to despread the baseband RX signal samples in a time divided fashion to produce channel symbols including pilot channel symbols and physical channel symbols. The output buffer 808 communicatively couples to the control logic 802 and the rake despreader module 806. Stored in the output buffer 808 are the channel symbols.

As is known, in a WCDMA system on the transmit side, channel symbols are spread using a channel spreading code and then scrambled using a scrambling code. Multiple channels that have been spread may be combined and jointly scrambled prior to the transmission. The function of the rake despreader module 320 is to produce channel symbols of multiple channels from the baseband RX signal samples by descrambling and then despreading the baseband RX signal samples using respective channel spreading sequences and one or more scrambling codes. In performing the descrambling and despreading operations, each chip of the RX signal samples is descrambled and despread and the descrambled/despread chips are accumulated over the spreading interval. The channel symbols are stored in the output buffer 808.

Once the accumulation process has been completed, the channel symbols are further processed by other components of the baseband processing module (or by other components of the baseband processor 222) to extract data, extract timing information, and to perform a wide variety of other functions. The post despreading processing module 810 is operable to perform at least one post despreading processing function on the channel symbols. Such post despreading processing functions may include channel estimation, channel equalization, signal strength estimation, gain control, diversity combining, power control bit extraction, frequency offset estimation, frequency correction, and phase correction among other processing functions. In various embodiments, these post despreading processing functions may be partially performed by the post despreading module 810 and further performed by other components of the baseband processing module 222.

Figure 9:
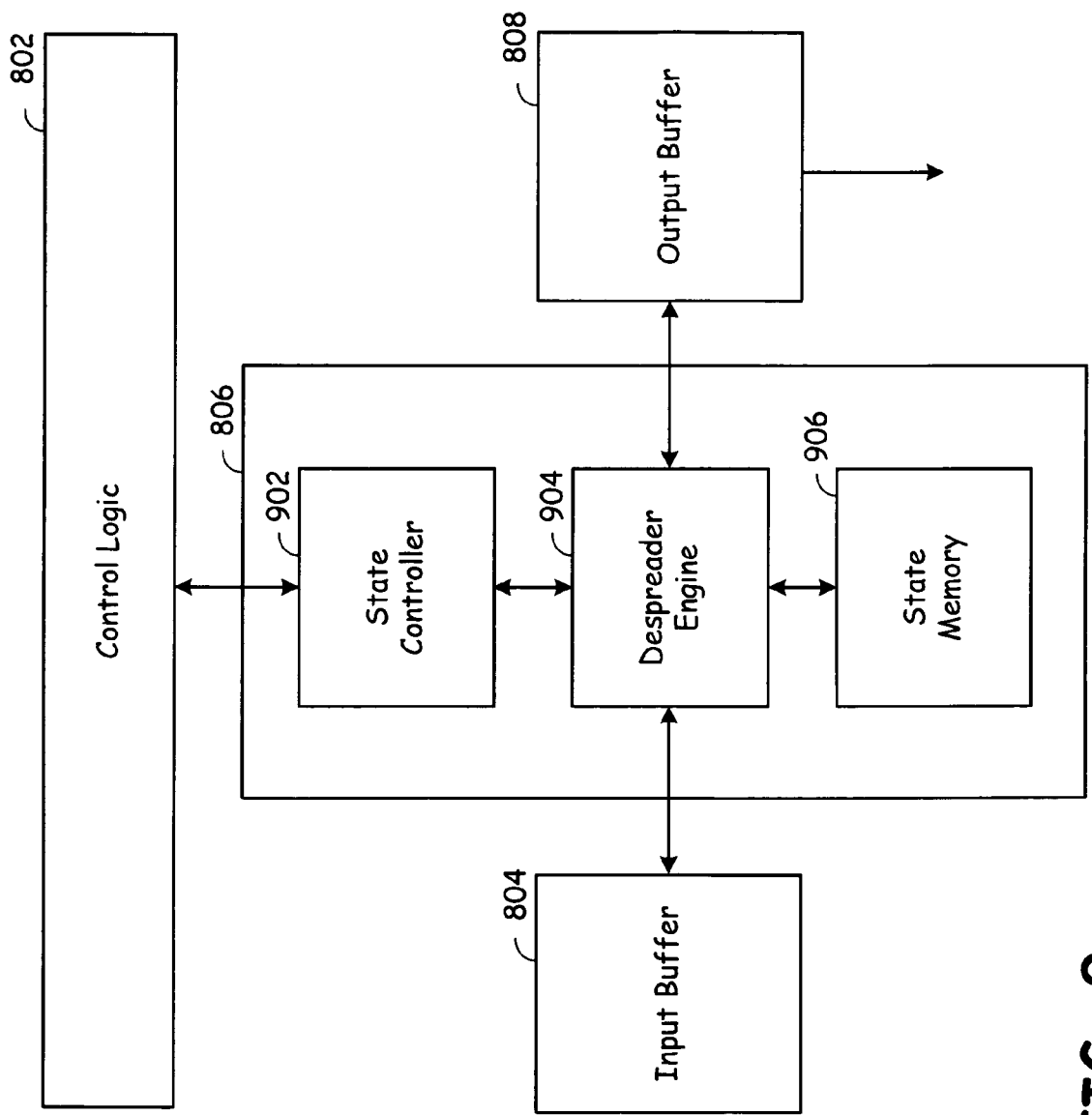
FIG. 9 is a block diagram illustrating components of a rake despreader module of the rake receiver combiner module of FIG. 8 according to an embodiment of the present invention.

FIG. 9 is a block diagram illustrating components of a rake despreader module of the rake receiver combiner module of FIG. 8 according to an embodiment of the present invention. The rake despreading module 806 may include a state controller 902, a despreader engine 904, and a state memory 906. The state controller 902 communicatively couples to the control logic 802. The despreader engine 904 communicatively couples to the state controller 902. The state memory 906 communicatively couples to the despreader engine 904. The depsreader engine 904 further couples to the input buffer 804 from which it receives baseband RX signal samples. The despreader engine 904 also couples to the output buffer 808 to which it outputs the channel symbols and/or the chip duration channel symbols. Details of the despreader engine 904 are further illustrated in FIG. 10. The state controller 902 includes control circuitry operable to control the despreader engine. The state memory 906 stores data pertinent to the operations performed by the rake despreading module 806.

Figure 10:
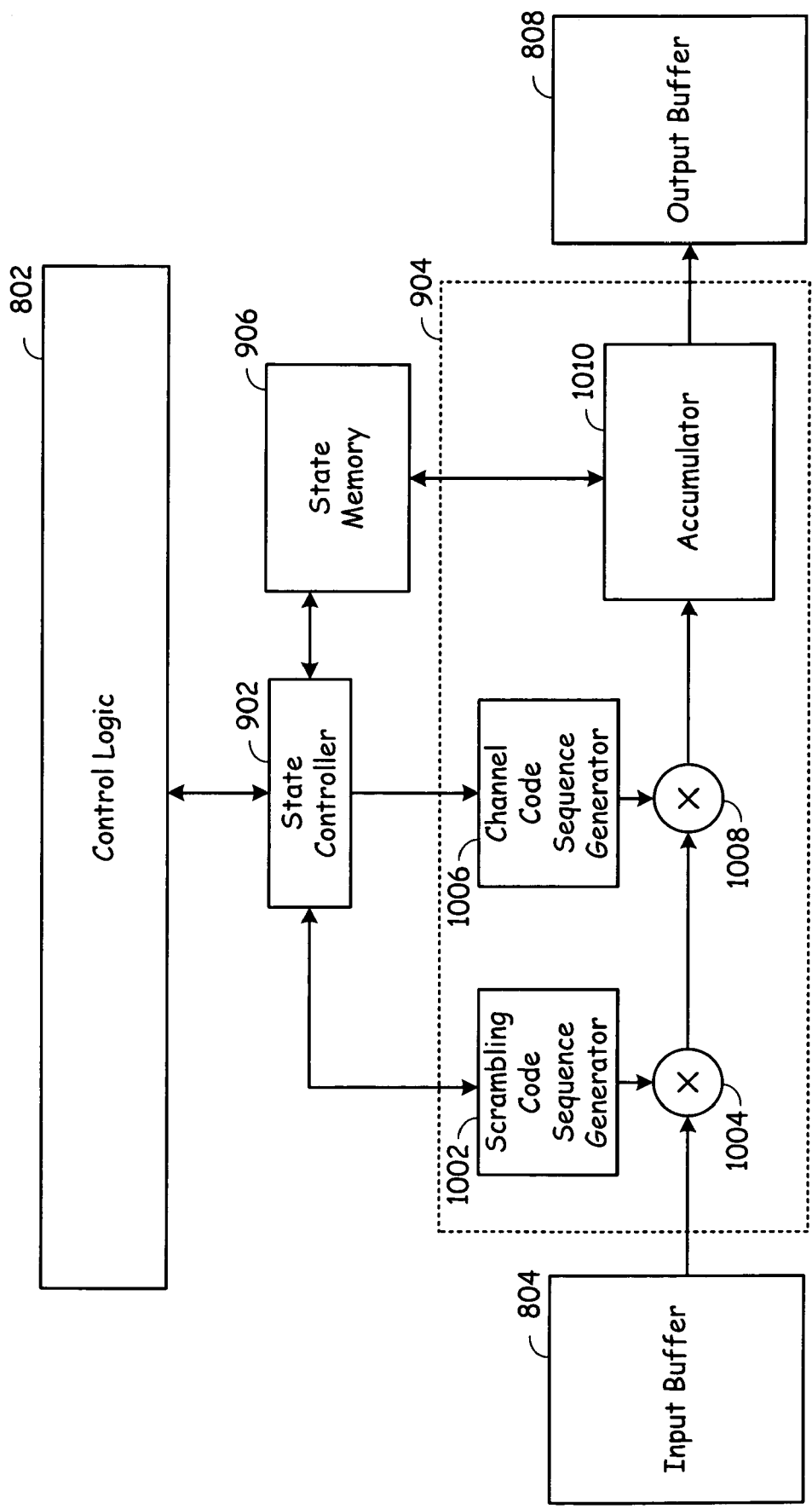
FIG. 10 is a block diagram illustrating components of a despreader engine of the rake despreader module of FIG. 9 according to an embodiment of the present invention.

FIG. 10 is a block diagram illustrating components of a despreader engine of the rake despreader module of FIG. 9 according to an embodiment of the present invention. The despreader engine 904 includes a scrambling code sequence generator 1002, a first multiplier 1004, a channel code sequence generator 1006, a second multiplier 1008, and an accumulator 1010. The scrambling code sequence generator 1002 is operable to generate a scrambling code sequence based upon input from the state controller 902. The first multiplier 1004 is operable to multiply the baseband RX signal samples with the scrambling code sequence generated by the scrambling code sequence generator 1002 to produce descrambled RX signal samples. In another embodiment, the first multiplier 1004 may be replaced with an adder. Thus, the first multiplier 1004 (adder in another embodiment) may be referred to as a first combiner. The channel code sequence generator 1006 is operable to generate a channel code sequence based upon inputs from the state controller 902. The second multiplier 1008 is operable to multiply the descrambled baseband RX signal samples with the channel code sequence generated by the channel code sequence generator 1006 to produce despread RX signal samples. In another embodiment, the second multiplier 1008 may be replaced with an adder. Thus, the second multiplier 1008 (adder in another embodiment) may be referred to as a first combiner. Finally, the accumulator 1010 is operable to accumulate the despread RX signal samples over the spreading interval to produce the channel symbols.

The input buffer 804 stores baseband RX signal samples extending over multiple chip periods. In one particular embodiment, the baseband RX signal samples are over sampled such that the duration of each of the baseband RX signal samples corresponds to a one-half of a chip. Thus, when performing its despreading operations, the despreader engine 904 accesses the input buffer 804 at appropriate points to select the appropriate baseband RX signal samples. As is generally known, a rake receiver combiner module attempts to extract the channel symbols from the WCDMA signal for a single path component. Referring again to FIG. 5A, serving cell multi-path signal components 504 have path components 508, 510, 512, and 514. In despreading the baseband RX signal, the despreader engine aligns with a particular path component, e.g., 512, for any particular despreading operation. Thus, for one despreading operation, the despreading operations are aligned with one path component, e.g., 512 while for another despreading operation, the despreading operations are aligned with another path component, e.g., path 514. Because this alignment corresponds to particular selection of RX signal samples from the input buffer 804, the state controller 902 and the control logic 802 coordinate the operations of the despreader engine 804 to read and operate upon an appropriate set of baseband RX signal samples that are stored in the input buffer 804 for the particular despreading operations performed.

Figure 11:
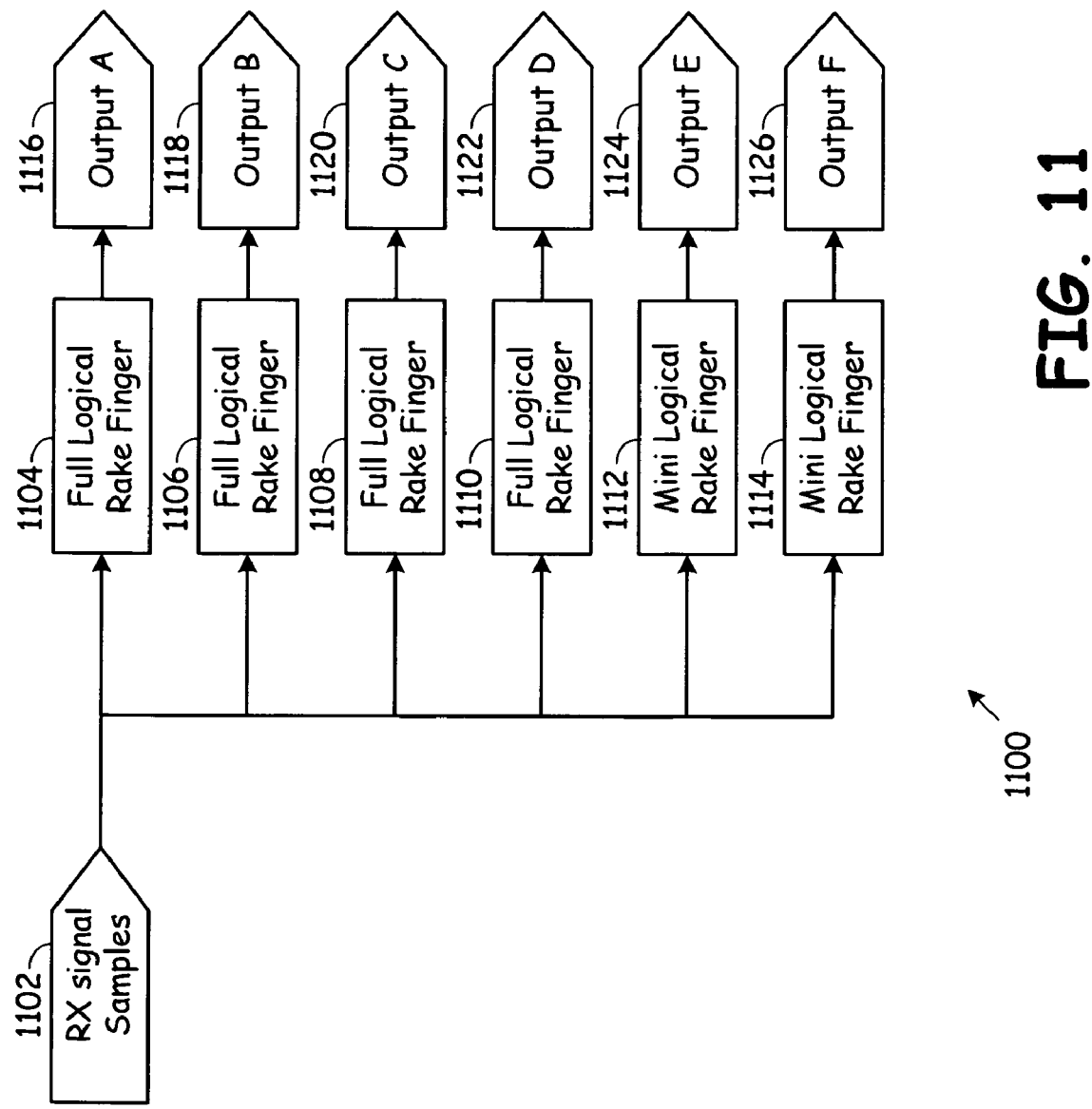
FIG. 11 is a block diagram illustrating the logical rake fingers of a rake receiver combiner module according to an embodiment of the present invention.

FIG. 11 is a block diagram illustrating the logical rake fingers of a rake receiver combiner module according to an embodiment of the present invention. The rake despreader module implements a plurality of logical rake fingers during a particular period of operation. The plurality of logical rake fingers may include a plurality of full logical rake fingers 1104, 1106, 1108, and 1110 as well as a plurality of mini logical rake fingers 1112 and 1114. These logical fingers 1110-1114 are implemented by common hardware elements of the rake despreader module, e.g., input buffer 804, rake despreader module 806, output buffer 808, and post despreading processing module 810 and are not distinct hardware components of the rake despreader module. Thus, all of these logical rake fingers 1104-1114 are implemented by the structure previously illustrated in FIGS. 8, 9 and 10. As will be further described with reference to FIGS. 12-14, these logical rake fingers are associated with particular path components of the WCDMA signal as was previously illustrated with reference to FIGS. 5A and 5B, although they are not associated with unique hardware elements, i.e., the hardware elements are shared over time in a time divided fashion.

Each of the logical rake fingers 1104-1114 operates upon the RX signal samples 1102 stored in input buffer 804. However, each of the full logical rake fingers 1104-1114 produces a corresponding output 1116-1126 that is unique to a respective WCDMA signal path component. These outputs 1116-1126 may include both pilot channel symbols and physical channel symbols. Such outputs according to one embodiment will be further illustrated in FIGS. 12 and 13 and described with reference thereto.

Figure 12:
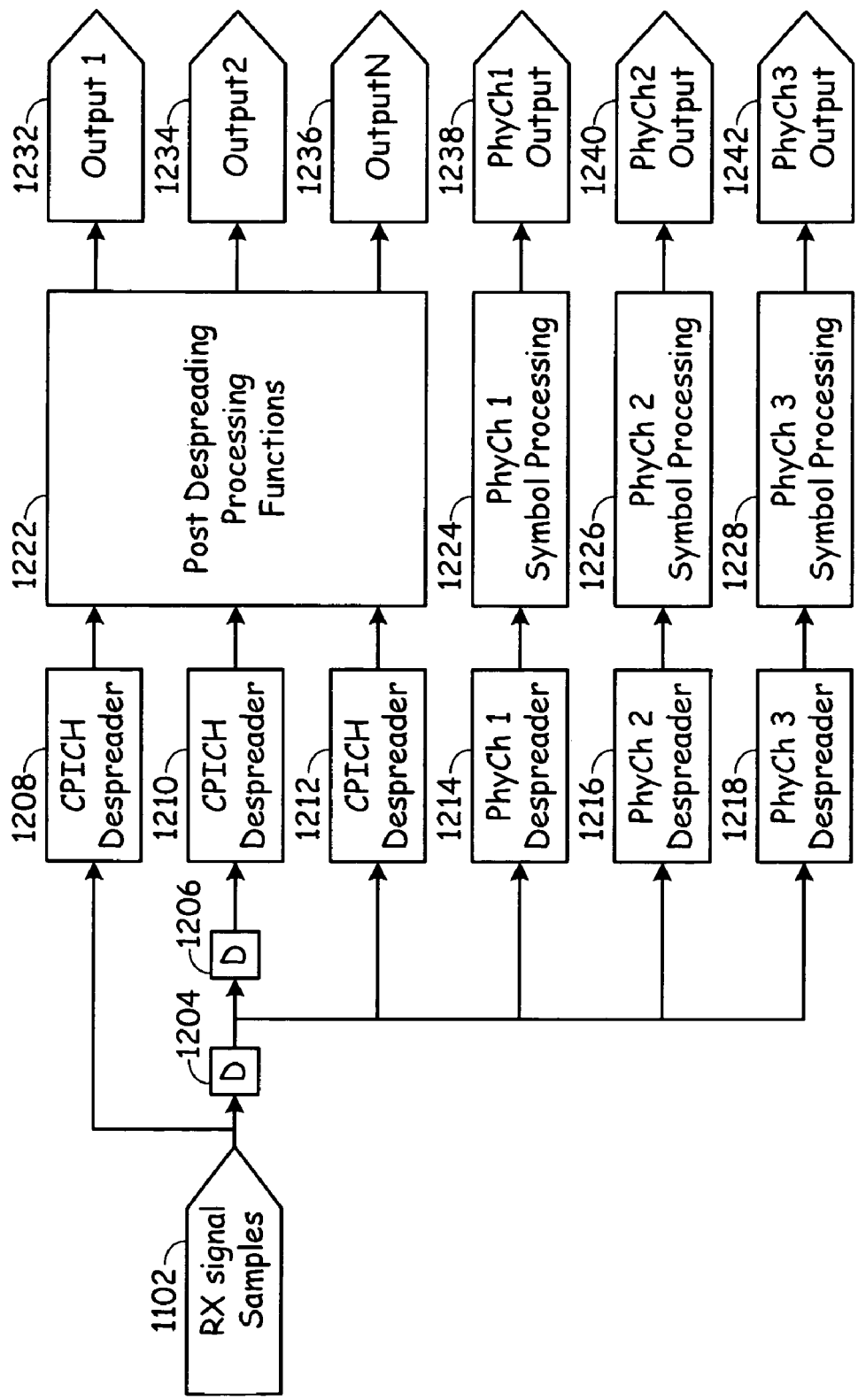
FIG. 12 is a block diagram illustrating logical components of a full logical rake finger of a rake receiver combiner module according to an embodiment of the present invention.

FIG. 12 is a block diagram illustrating logical components of a full logical rake finger of a rake receiver combiner module according to an embodiment of the present invention. The full logical rake finger 1200 includes delay elements 1204 and 1206 and CPICH despreaders 1208, 1210, and 1212 that perform pilot channel descrambling/despreading operations. In coordination with the delay elements 1204 and 1206, CPICH despreader 1208 performs an early despreading operation with respect to a path component of the WCDMA signal. Further, CPICH despreader 1212 performs an on-time despreading of the path of the WCDMA signal. Further, CPICH despreader 1210 performs a late despreading of the WCDMA signal for the CPICH. As was previously described, the RX signal samples include multiple samples for each particular chip. Thus, with the combination of the delay elements 1204 and 1206 and the CPICH despreader 1208, 1210, and 1212, the logical rake finger can detect the alignment of the despreader to the path component of the WCDMA signal within a partial chip duration, e.g., one-half chip duration. These operations support a fine alignment in time of the rake despreader module for traffic channel despreading, which results in better channel symbol 10, production. Discernment of the time alignment as well as the other post despreading processing functions are performed by the post despreading processing functions element 1222. The post despreading processing functions element 1222 produce output 1 1232, output 2 1234 and output N 1236. The post despreading processing functions 1222 may produce additional outputs as well as have been previously described with reference to the post despreading processing module of FIG. 8.

Still referring to FIG. 12, the full logical rake finger 1200 includes three physical channel despreaders 1214, 1216, and 1218. Each of these physical channel despreaders 1214-1218 descrambles, despreads, and extracts channel symbols for a respective physical channel. Physical channel symbol processing blocks 1224, 1226, and 1228 couple to physical channel despreaders 1214, 1216, and 1218 and perform symbol processing operations. The Physical channel symbol processing blocks 1224, 1226, and 1228 produce outputs 1238, 1240, and 1242, respectively.

Figure 13:
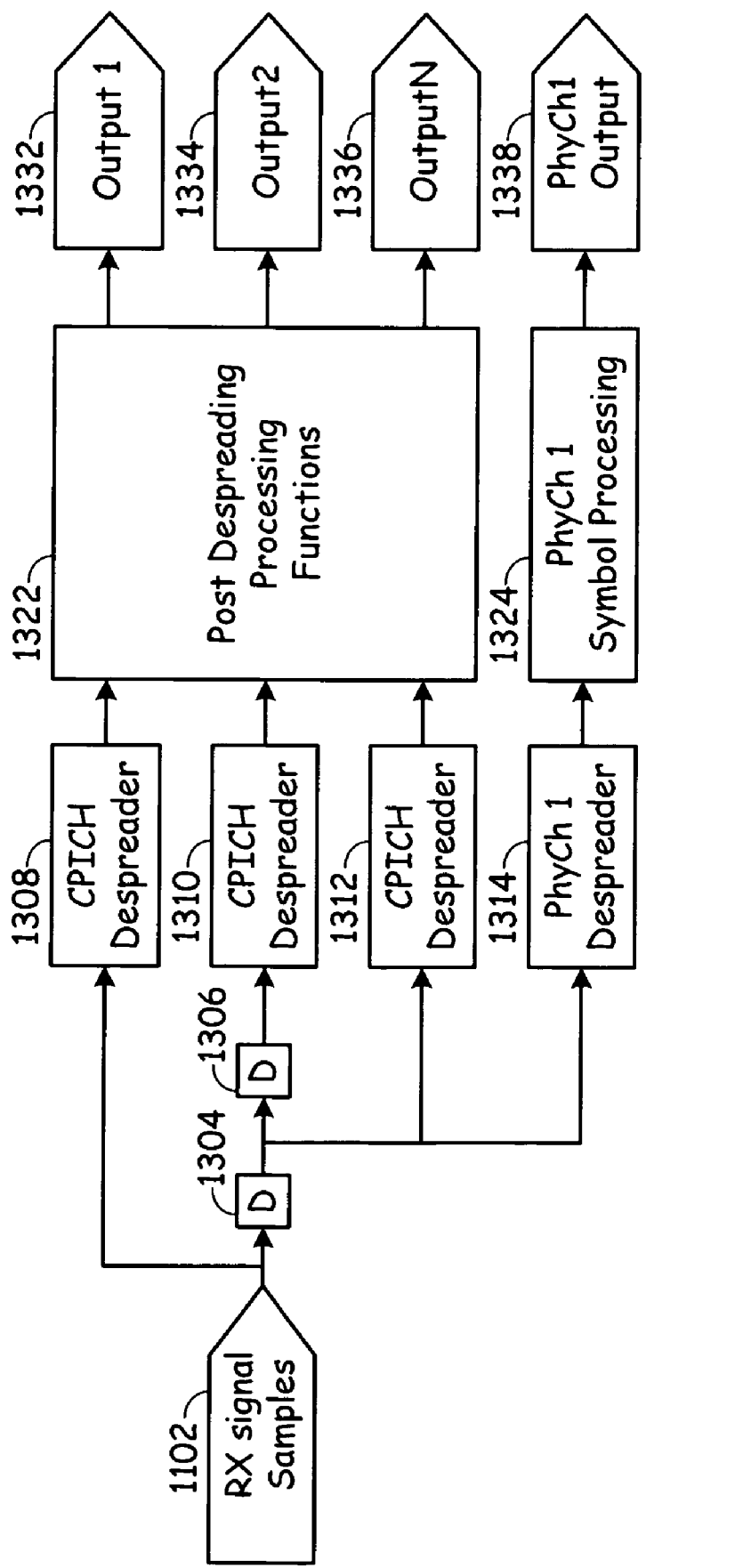
FIG. 13 is a block diagram illustrating logical components of a mini logical rake finger of a rake receiver combiner module according to an embodiment of the present invention.

FIG. 13 is a block diagram illustrating logical components of a mini logical rake finger of a rake receiver combiner module according to an embodiment of the present invention. The mini logical rake finger 1300 includes some of the same elements as does the full logical rake finger 1200 of FIG. 12. In particular, the mini logical rake finger 1300 includes delay elements 1304, 1306, and CPICH despreaders 1308, 1310, and 1312. This combination of elements provides early, on-time, and late pilot channel despreading operations. The output of the CPICH despreaders 1308, 1310, and 1312 is received by post despreading processing functions 1322 which produces outputs 1332, 1334, and 1336. As contrasted to the full logical rake finger of FIG. 12, the mini logical rake finger 1300 of FIG. 13 includes only a single physical channel despreader 1314, single physical channel symbol processing 1324, and a single physical channel output 1338.

Figure 14:
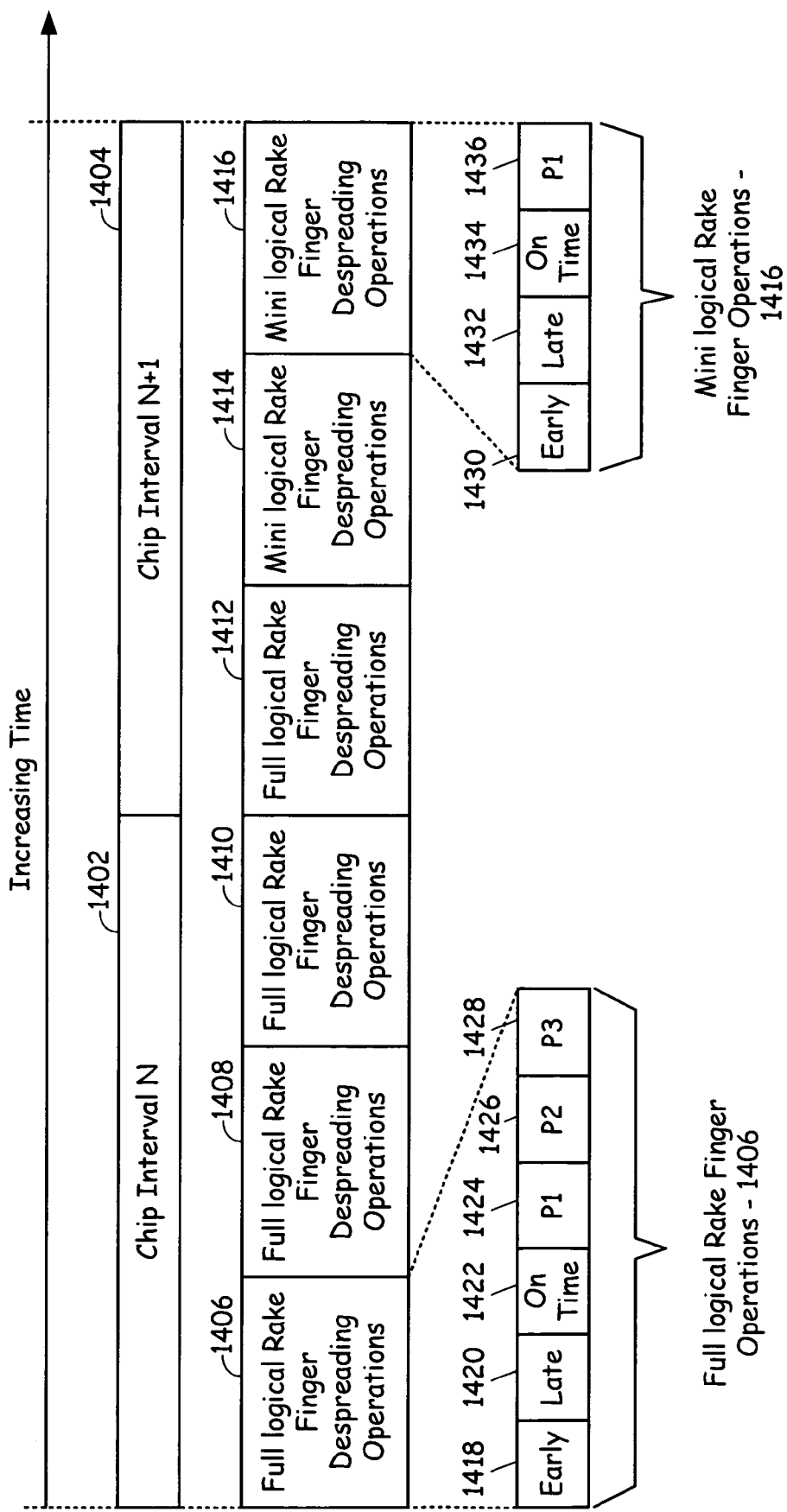
FIG. 14 is a block diagram illustrating the manner in which a rake receiver combiner module of an embodiment of the present invention sequentially performs logical rake finger despreading operations.

FIG. 14 is a block diagram illustrating the manner in which a rake receiver combiner module of an embodiment of the present invention sequentially performs logical rake finger despreading operations. With the illustrated example, the time divided fashion in which the rake despreader module despreads the baseband RX signal samples occurs over two chip intervals 1402 and 1404. As is shown, over these two chip intervals 1402 and 1404, four full logical rake finger despreading operations 1406, 1408, 1410, and 1412 and two mini logical rake finger despreading operations 1414 and 1416 are performed. While a particular time alignment is shown with regard to the chip intervals 1402 and 1404, this is for ease of the description only and such time alignment may not occur in practice. The actual duration in which the logical rake finger despreading operations are performed is based on the processing capability of the particular embodiment. Thus, in some embodiments, fewer or greater numbers of logical rake finger despreading operations may be performed within the multiple chip intervals. Further, the number of chip intervals during which the logical rake finger despreading operations performed may be other than two. It could be a single chip interval or more than two chip intervals.

As the reader will appreciate though, the logical operations performed over the multiple chip intervals will perform despreading for those chips already received during a corresponding number of prior chip intervals. Thus, as is shown in FIG. 14, the operations 1406-1416 are performed during chip intervals 1402 and 1404. The despreading operations, of course, are performed on chips previously received by the baseband processing module 22 and stored in the input buffer 804. In this case, while the baseband processing module 222 is receiving new chips of a spreading interval, it is despreading previously received chips of the spreading interval. Thus, the baseband processing module 222 and particularly, the rake receiver combining module 320 will be continually operating upon chips of the spreading interval and such despreading will be performed on chips in the spreading interval after receipt. While the despread chips cannot be accumulated until the spreading interval is complete, they can be operated on without waiting for all chips in the spreading interval to be received.

As was previously described with reference to FIG. 12, full logical rake finger despreading operations 1406 of FIG. 14 include early pilot channel despreading operations 1418, on-time pilot channel despreading operations 1422, late pilot channel despreading operations 1420, first physical channel despreading operations 1424, second physical channel despreading operations 1426, and third physical channel despreading operations 1428. The full logical rake finger operations 1406 correspond to the structure 1200 illustrated in FIG. 12. Mini logical rake finger operations 1416 of FIG. 14 correspond to the mini logical rake finger structure 1300 of FIG. 13. These mini logical rake finger despreading operations include early pilot channel despreading operations 1430, late pilot channel despreading operations 1432, on-time pilot channel despreading operations 1434, and a single physical channel despreading operation 1436.

Figure 15:
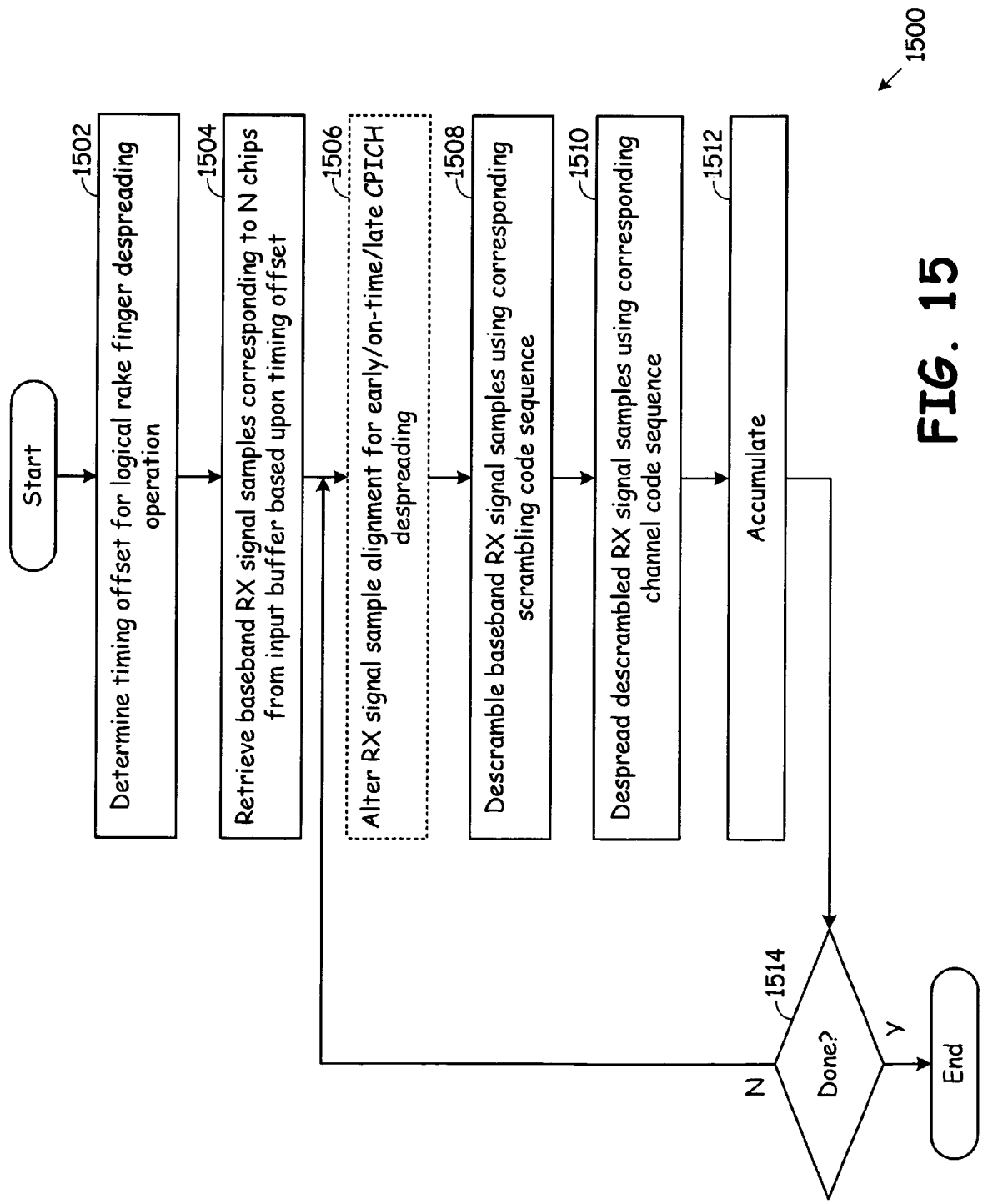
FIG. 15 is a flow chart illustrating the sequential performance of logical rake finger despreading operations according to an embodiment of the present invention.

FIG. 15 is a flow chart illustrating the sequential performance of logical rake finger despreading operations according to an embodiment of the present invention. The operations 1500 of FIG. 15 may correspond to any of the logical rake finger operations 1418-1428 of the full logical rake finger operations 1406 and/or to the mini logical rake finger despreading operations 1414 or 1416 of FIG. 14. The operations of FIG. 15 commence with determining a timing offset for the logical rake finger despreading operations (Step 1502). As has been previously described, each of the logical despreading operations attempts to despread a particular path component of the WCDMA signal, for which alignment to the baseband RX signal samples stored in the input buffer is required. Based upon this timing offset, baseband RX signal samples are retrieved from the input buffer (Step 1504). Then, if an early, on-time, or late pilot channel spreading operation is to be performed, a time offset by one sample (multiple samples) may be performed (Step 1506). When despreading of a physical channel is being performed, such realignment of the samples would not be employed.

Next, operation includes descrambling the baseband RX signal samples using a corresponding scrambling code sequence (Step 1508). Then, operation includes despreading the descrambled RX signal samples using a corresponding channel spreading sequence (Step 1510). Then, operation includes accumulating the descrambled and despread RX signal samples (Step 1512). When operation 1512 is complete, it is determined whether the logical rake finger operations have been completed (Step 1514). For a full logical rake finger, the early, on-time, and late pilot channel despreading operations are performed and the plurality of physical channel despreading operations are performed. When these operations are completed, operation ends. For the mini logical rake finger despreading operations, the early, on-time, and late pilot channel despreading operations are performed. Then, a single physical channel despreading operation is performed. This would complete the operations from the mini finger. Thus, the operations of Steps 1506-1512 are performed for each of these pilot and physical channel despreading operations for one embodiment.

Figure 16:
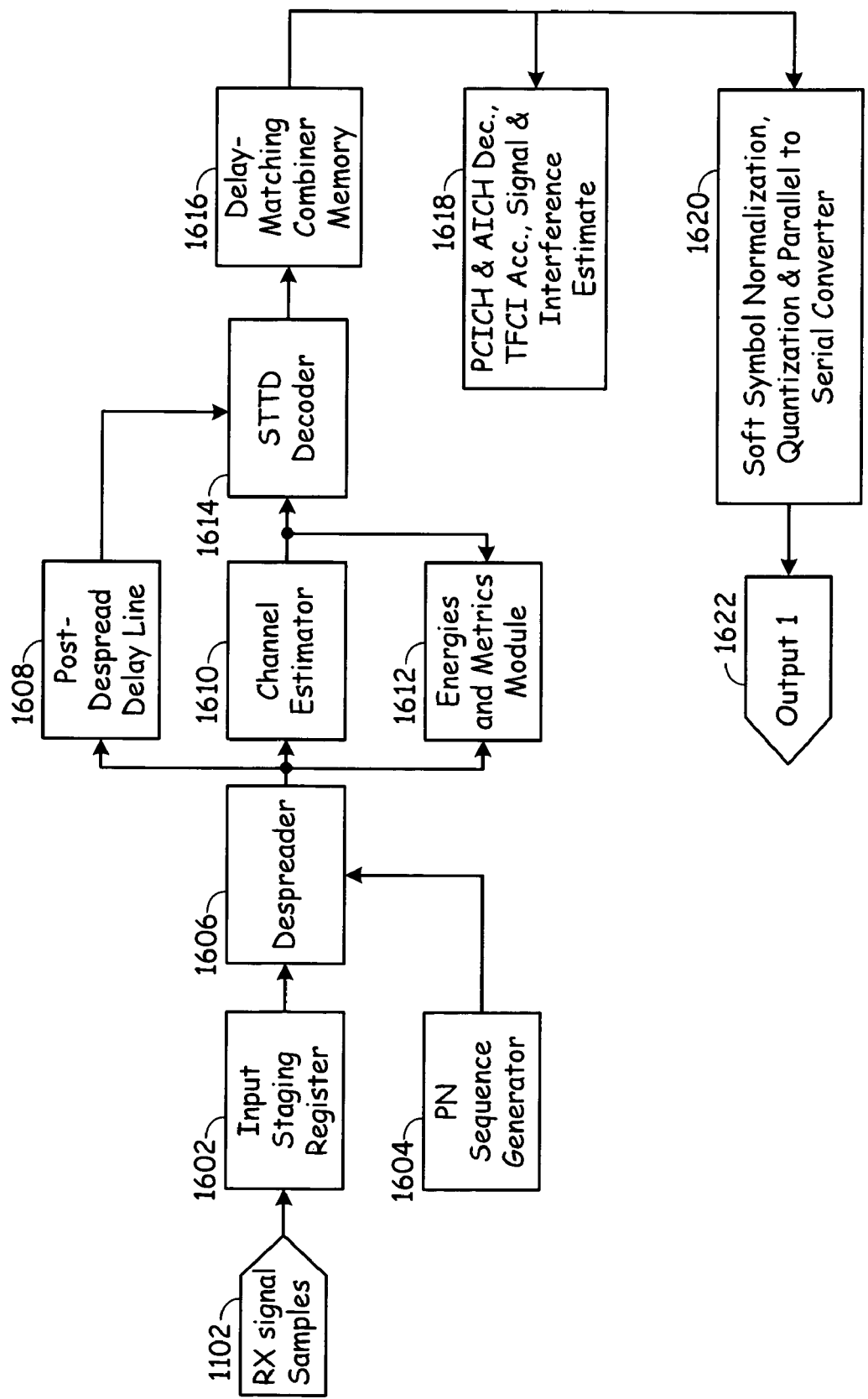
FIG. 16 is a block diagram illustrating another embodiment of a rake despreader module constructed and operating according to the present invention.

FIG. 16 is a block diagram illustrating another embodiment of a rake despreader module constructed and operating according to the present invention. The rake despreader module 1600 includes an input staging register 1602 that receives the RX signal samples. A PN sequence generator 1604 generates a PN sequence that a despreader 1606 employs to despread appropriate RX signal samples. With one construct, the despreader 1606 despreads two symbols in each despreading operation. A post-despread delay line 1608, a channel estimator 1610, and an energies and metrics module 1612 receive the despread output of the despreader 1606 and perform corresponding operations. The energies and metrics module 1612 also receives the output of the channel estimator 1610. An STTD decoder 1614 receives the outputs of the channel estimator 1610 and the post-despread delay line 1608 and operates upon the delayed despread samples using a channel estimate produced by the channel estimator 1610.

A delay matching combiner memory 1616 receives the output of the STTD decoder 1614 and performs combining operations on the decoded samples. A PCICH & AICH decoder/TFCI accumulator/signal and interference estimation bock 1618 receives the output from the delay matching combiner memory 1616 and performs corresponding operations. A soft symbol normalization, quantization, and parallel to serial converter 1620 also receives the output of the delay matching combiner memory 1616 and performs corresponding operations and produces corresponding output(s).

Figure 17:
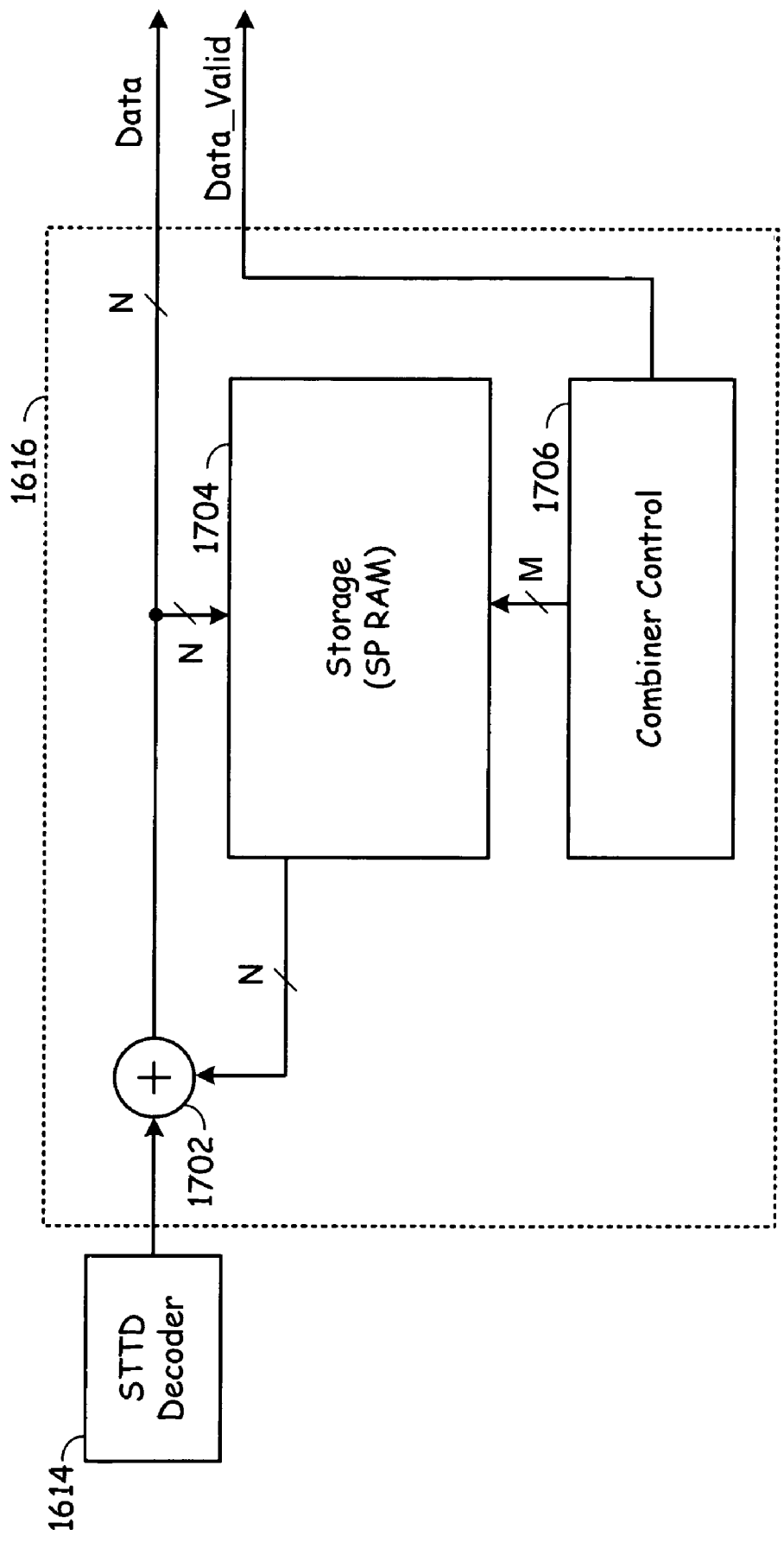
FIG. 17 is a block diagram illustrating an embodiment of a combiner module of the embodiment of the rake despreader module of FIG. 16.

FIG. 17 is a block diagram illustrating an embodiment of a combiner module of the embodiment of the rake despreader module of FIG. 16. As shown, the combiner module 1616 receives the output of the STTD decoder 1614. The combiner module 1616 includes an adder 1702, storage 1704, and 1706 that are intercoupled to provide the operations of the combiner module 1616. The combiner module 1616 produces both a data output and a data valid output.

Figure 18:
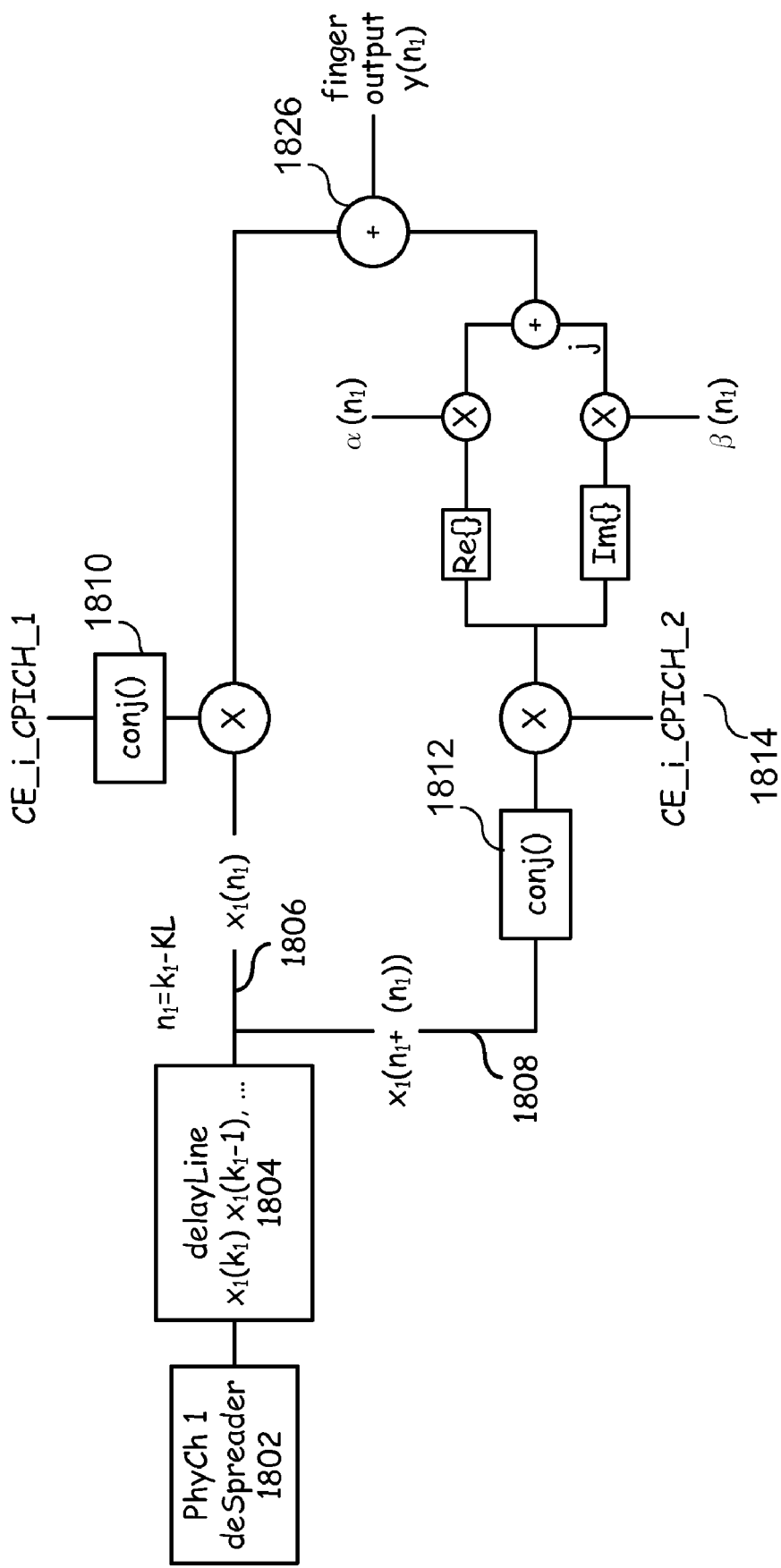
FIG. 18 provides a block diagram of an STTD decoder in accordance with an embodiment of the present invention.

FIG. 18 provides a block diagram of an STT decoder such as STTD decoder 1614 in accordance with an embodiment of the present invention. This decoder includes a physical channel despreader 1802 a delay buffer 1804 which provides input to an upper branch 1806 and lower branch 1808 of the decoder. A first portion of the received signal is operated on by a first channel estimate function in order to produce a first output from the first output. In one embodiment this first branch may operate on bits that have neither been flipped nor rearranged.

Figure 19:
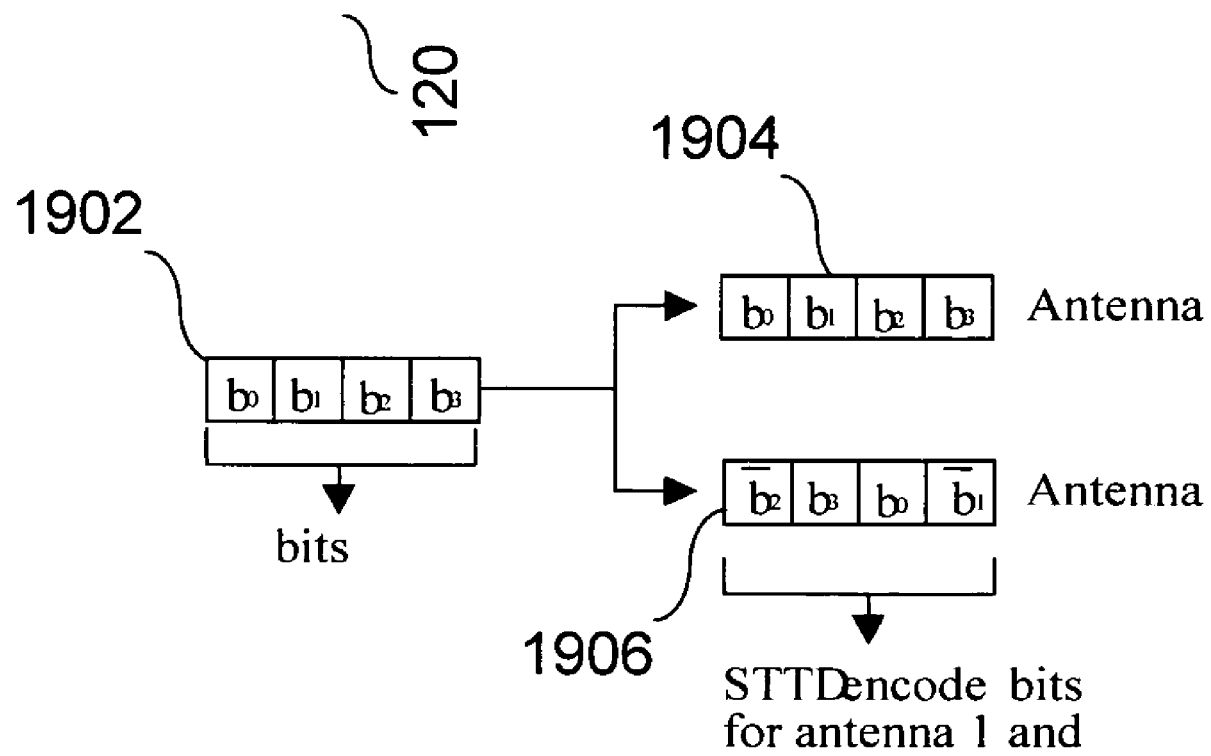
FIG. 19 provides a generic block diagram of how bits may be flipped or rearranged when transmitted over multiple antennas.

FIG. 19 provides a generic block diagram of how bits may be flipped or rearranged when transmitted over multiple antennas. This particular case depicts two antennas using an STTD encoder. Here the initial bits 1902 are encoded for transmission via two antennas. The set of bits 1904 may be in this case transmitted according to a normal mode. Bits 1906 are operated on such that the symbol order of the bits may be altered as well flipping some of the bits. These may be flipped according to a dedicated pattern such as that described below.

A common STTD decoder scheme is shown in FIG. 19. By choosing different value for $\delta(n)$, $\alpha(n)$, and $\beta(n)$, we can obtain decoder for the generic STTD, DPCH DP and P-CCPCH.

Generic STTD

Let (b0,b1)->s0, (b2,b3)->s1, h1 and h2 are channel corresponding to antenna 1 and 2, respectively. The de-spreader output is given by, $$r_0 = h_1 s_0 - h_2 s_1^* + n_0$$

$$r_1 = h_1 s_1 + h_2 s_0^* + n_1$$

The STTD decoder is given by $$\begin{aligned} y_0 &= h_1^* r_0 + h_2 r_1^* \\ &= (|h_1|^2 + |h_2|^2) s_0 + h_1^* n_0 + h_2 n_1^* \\ &= h_1^* r_0 + \text{Re}\{h_2 r_{0+1}^*\} + j\text{Im}\{h_2 r_{0+1}^*\} \\ y_1 &= h_1^* r_1 - h_2 r_0^* \\ &= (|h_1|^2 + |h_2|^2) s_1 + h_1^* n_1 - h_2 n_0^* \\ &= h_1^* r_1 - \text{Re}\{h_2 r_{1-1}^*\} - j\text{Im}\{h_2 r_{1-1}^*\} \end{aligned} \quad (1)$$

For n is even, we have $\delta(n)=1$ $\alpha(n)=1$ $\beta(n)=1$

For n is odd, we have $\delta(n)=-1$ $\alpha(n)=-1$ $\beta(n)=-1$

DPCH DP

In the case of 4 or 8 DP, odd DP symbols are encoded as the generic STTD encoder and even symbols are orthogonal:

TX1: {A $s_1$ A $s_3$ A $s_5$ A $s_7$}

TX2: {A $-(s_3)^*$ $-A (s_1)^*$ A $-(s_7)^*$ $-A (s_5)^*$}

For n is 1,5, we have $\delta(n)=2$ $\alpha(n)=1$ $\beta(n)=1$

For n is 3,7, we have $\delta(n)=-2$ $\alpha(n)=-1$ $\beta(n)=-1$

For even DP symbols which are not STTD encoded but orthogonal, we can translate them into STTD form so that SIR estimation and soft bit quantization still can utilize these DP symbols. Basically, we modify the generic STTD decoder (1) as following:

$y_0 = h_1^* r_0 - h_2^* r_2$ $y_2 = h_1^* r_2 + h_2^* r_0$

For n is 0,4, we have $\delta(n)=2$ $\alpha(n)=-1$ $\beta(n)=1$

For n is 2,6, we have $\delta(n)=-2$ $\alpha(n)=1$ $\beta(n)=-1$

EXAMPLE

Suppose we use Slot Format 11 as shown below.

| Slot Format #i | Channel Bit Rate (kbps) | Channel Symbol Rate | SF | Bits/ Slot | DPDCH Bits/Slot $N_{Dat}$ | $N_{Dat}$ | DPCCH Bits/Slot $N_{TPC}$ | $N_{TF}$ | $N_{Pilo}$ | Transmitted slots per radio frame |
|---|---|---|---|---|---|---|---|---|---|---|
| 11 | 60 | 30 | 128 | 40 | 6 | 22 | 2 | 2 | 8 | 15 |

There are 20 symbols in a slot, and 8 DP bits (4 symbols) per slot. The $\delta(n)$, $\alpha(n)$, and $\beta(n)$ are listed in the following table.

| | | | | | | | | | | n | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| $\delta(n)$ | 1 | −1 | 1 | −1 | 1 | −1 | 1 | −1 | 1 | −1 | 1 | −1 | 1 | −1 | 1 | −1 | 2 | 2 | −2 | −2 |
| $\alpha(n)$ | 1 | −1 | 1 | −1 | 1 | −1 | 1 | −1 | 1 | −1 | 1 | −1 | 1 | −1 | 1 | −1 | −1 | 1 | 1 | −1 |
| $\beta(n)$ | 1 | −1 | 1 | −1 | 1 | −1 | 1 | −1 | 1 | −1 | 1 | −1 | 1 | −1 | 1 | −1 | 1 | 1 | −1 | −1 |

Returning to FIG. 18, upper branch 1806 of the STTD decoder 1800 processes bits associated with the normal mode STTD and transmitted bits from the first antenna. The channel estimate is used to produce a conjugate function 1810 that takes into consideration not only the channel estimate but also interference associated with transmission from the second or additional antennas. The lower branch 1808 will index or delay the processing of the data and produce a second conjugate function 1812. This will be mixed with channel estimate 1814 in order to produce a real and imaginary portion of the bits. Then the appropriate pattern may be applied by choosing an appropriate values of α and β. This may result in a second set of the bits which have been processed (i.e. reordered and appropriately flipped) such that the combination of lower branch 1808 output may properly combine with the output of upper branch 1806 in combiner 1826 to produce a normal mode output of bits.

FIG. 18 shows a block diagram of STTD decoder 1614. When processing non-STTD signals, the lower branch is turned off. Depending on the CE delay L, STTD decoder reads the corresponding delayed data symbol x(k-KL) and weights the symbol with the conjugate of CE.

In the STTD mode, the TX symbols are encoded using the generic STTD encoder as shown in FIG. 19 with exception of DPCH dedicated pilot (DP) symbols and P-CCPCH. In the case of DPCH with 4 or 8 dedicated pilot symbols, odd symbols are STTD encoded. Even symbols are orthogonal between TX1 and TX2. For P-CCPCH, since the first symbol in the slot is DTX, there are 9 data symbols in a slot. The last symbol in even slot is STDD encoded with the $1^{st}$ data symbol in the following slot, except for slot #14 where the last symbol is not STTD encoded.

The principles of the present invention apply equally well to other wireless communication systems that require rake receiver type operations. These types of systems may be CDMA systems, other spread spectrum systems, Orthogonal Frequency Division Multiplex (OFDM) systems, and other types of wireless communication systems. While the description herein has focused on WCDMA systems, other embodiments would directly apply to these other types of wireless communication systems.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A Space Time Transmit Diversity (STTD) Decoder operable to operate on a received signal, the STTD decoder comprising:
   a physical channel despreader operable to despread the received signal to produce a symbol output;
   a delay buffer operable to receive the symbol output and to produce a delay buffer symbol output;
   an upper processing branch operable to apply a conjugate of a first channel estimate to the delay buffer symbol output to produce non STTD encoded symbols of the upper processing branch; and
   a lower processing branch operable to read delayed delay buffer symbol output, and to apply a conjugate of a second channel estimate and a STTD decoder scheme to the delayed delay buffer symbol output to produce non STTD encoded symbols of the lower processing branch.

2. The STTD Decoder of claim 1, wherein a first portion of the received signal is operated on by a first channel estimate function.

3. The STTD Decoder of claim 1, further comprising:
   a combiner operable to combine the non STTD encoded symbols of the upper processing branch and the non STTD encoded symbols of the lower processing branch.

4. The STTD Decoder of claim 1, wherein the upper branch operates on bits that have neither been flipped nor rearranged.

5. The STTD Decoder of claim 1, wherein the upper branch operates on bits that have been flipped or rearranged.

6. The STTD Decoder of claim 5, wherein the bits are flipped or rearranged according to a dedicated pattern.

7. The STTD Decoder of claim 1, wherein the lower branch is secured when processing non-STTD signals.

8. The STTD Decoder of claim 1, wherein the STTD decoder is within a rake receiver of a wireless communication system.

9. The STTD Decoder of claim 8, wherein the wireless communication system comprises one or more of CDMA systems, spread spectrum systems, and Orthogonal Frequency Division Multiplex (OFDM) systems.

10. A Space Time Transmit Diversity (STTD) Decoder operable to operate on a received signal, the STTD decoder comprising:
    a physical channel despreader operable to despread the received signal to produce a symbol output;
    a delay buffer operable to receive the symbol output to produce a delay buffer symbol output;
    an upper processing branch operable to apply a conjugate of a first channel estimate to the delay buffer symbol output and to produce non STTD encoded symbols of the upper processing branch;
    a lower processing branch operable to read delayed delay buffer symbol output, to conjugate the delayed delay buffer symbol output, and to apply a second channel estimate and a STTD decoder scheme to the conjugated delayed delay buffer symbol output to produce non STTD encoded symbols of the lower processing branch; and
    a combiner operable to combine the non STTD encoded symbols of the upper processing branch and non STTD encoded symbols of the lower processing branch.

11. The STTD Decoder of claim 10, wherein a first portion of the received signal is operated on by a first channel estimate function.

12. The STTD Decoder of claim 10, wherein the upper branch operates on bits that have neither been flipped nor rearranged.

13. The STTD Decoder of claim 10, wherein the upper branch operates on bits that have been flipped or rearranged.

14. The STTD Decoder of claim 13, wherein the bits are flipped or rearranged according to a dedicated pattern.

15. The STTD Decoder of claim 10, wherein the lower branch is secured when processing non-STTD signals.

16. The STTD Decoder of claim 10, wherein the STTD decoder is within a rake receiver of a wireless communication system.

17. The STTD Decoder of claim 16, wherein the wireless communication system comprises one or more of CDMA systems, spread spectrum systems, and Orthogonal Frequency Division Multiplex (OFDM) systems.

18. A Space Time Transmit Diversity (STTD) Decoder operable to operate on a received signal, the STTD decoder comprising:
    a physical channel despreader operable to despread the received signal to produce a symbol output;
    a delay buffer operable to receive the symbol output and to produce a delay buffer symbol output;
    an upper processing branch operable to apply a conjugate of a first channel estimate to the delay buffer symbol output to produce non STTD encoded symbols of the upper processing branch;
    a lower processing branch operable to read delayed delay buffer symbol output, to conjugate the delayed delay buffer symbol output, and to apply a STTD decoder scheme to the conjugated delayed delay buffer symbol output to produce non STTD encoded symbols of the lower processing branch; and
    a combiner operable to combine the non STTD encoded symbols of the upper processing branch and the non STTD encoded symbols of the lower processing branch.

19. The STTD Decoder of claim 18, wherein the lower branch is secured when processing non-STTD signals.

20. The STTD Decoder of claim 18, wherein the upper branch operates on bits that have neither been flipped nor rearranged.

21. The STTD Decoder of claim 18, wherein the upper branch operates on bits that have been flipped or rearranged.

* * * * *